(12) United States Patent
Chen et al.

(10) Patent No.: US 8,503,983 B2
(45) Date of Patent: Aug. 6, 2013

(54) MANAGEMENT OF CDMA CREDENTIALS ON A SMART CARD

(75) Inventors: Xuming Chen, San Ramon, CA (US); Bhaskar Srinivasiah, Atlanta, GA (US)

(73) Assignees: Verizon Patent and Licensing Inc., Basking Ridge, NJ (US); Cellco Partnership, Basking Ridge, NJ (US)

(*) Notice: Subject to any disclaimer, the term of this patent is extended or adjusted under 35 U.S.C. 154(b) by 0 days.

(21) Appl. No.: 13/525,802

(22) Filed: Jun. 18, 2012

(65) Prior Publication Data
US 2012/0258690 A1  Oct. 11, 2012

Related U.S. Application Data

(62) Division of application No. 12/631,314, filed on Dec. 4, 2009, now Pat. No. 8,219,065.

(51) Int. Cl.
*H04W 4/00* (2009.01)
*H04B 1/00* (2006.01)
*G06F 9/30* (2006.01)

(52) U.S. Cl.
USPC ......... 455/411; 455/432.3; 455/558; 712/208

(58) Field of Classification Search
USPC .................. 455/558, 406, 452.1, 432.3, 410; 712/208
See application file for complete search history.

(56) References Cited

U.S. PATENT DOCUMENTS

| | | |
|---|---|---|
| 2006/0009214 A1 | 1/2006 | Cardina et al. |
| 2007/0238486 A1 | 10/2007 | Lai et al. |
| 2011/0269421 A1* | 11/2011 | Moore et al. .................. 455/406 |

* cited by examiner

*Primary Examiner* — Nizar Sivji

(57) ABSTRACT

A method is performed by a user device and a smart card inserted into the user device. The method includes storing, in the smart card, information to permit the user device to communicate with a particular network; identifying a first smart card identifier associated with the smart card; identifying a second smart card identifier associated with a previous smart card inserted into the user device; comparing the first smart card identifier and the second smart card identifier to generate a first comparison result; pushing, by the smart card and to the user device, the information when the first comparison result indicates that the first smart card identifier matches the second smart card identifier; and obtaining, by the user device, access to the particular network using the information received from the smart card.

17 Claims, 15 Drawing Sheets

110

US 8,503,983 B2

MANAGEMENT OF CDMA CREDENTIALS ON A SMART CARD

RELATED APPLICATION

This application is a divisional of co-pending U.S. patent application Ser. No. 12/631,314, filed on Dec. 4, 2009, entitled "MANAGEMENT OF CDMA CREDENTIALS ON A SMART CARD," the disclosure of which is hereby incorporated by reference herein.

BACKGROUND

Mobile terminals may utilize Universal Integrated Circuit Cards (UICCs) to access various types of networks. A UICC is a smart card used in mobile terminals in global system for mobile communications (GSM) and universal mobile telecommunications system (UMTS) networks. The UICC ensures the integrity and security of personal data.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

As will be described herein, systems and/or methods may permit code division multiple access (CDMA) credentials to reside on a smart card, such as a UICC, so that a user may change user devices and the CDMA credentials may follow. As used herein, the term "CDMA credentials" refers to information that a user device may use to connect to, or to access services and/or resources on, a CDMA network. Storing CDMA credentials on a smart card is in contrast to existing approaches in which CDMA credentials may reside on the user device so that when the user changes user devices, the CDMA credentials do not follow. Rather, under existing approaches, when the CDMA credentials reside on the user device, and the user changes to another user device, user intervention is required to re-provision the other user device. For example, the user may need to interact, via the other user device, with a network that the user wishes to utilize, so that the network may push the CDMA credentials to the other user device. In contrast, according to the systems and/or methods described herein, user intervention may not be required when the user changes to another user device.

Figure 1A:
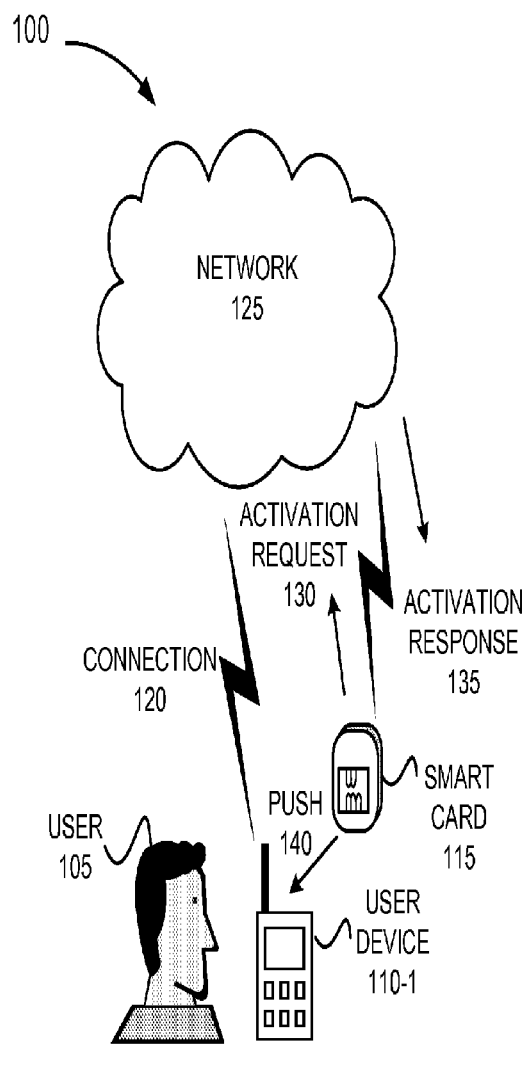
FIGS. 1A and 1B are diagrams illustrating an exemplary implementation in which management of CDMA credentials on a smart card may be implemented.
Figure 1B:
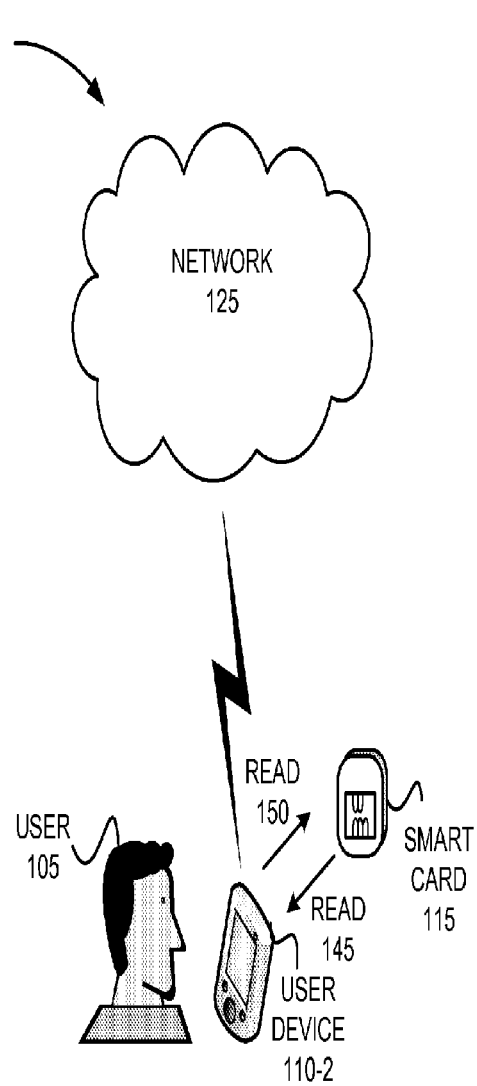

FIGS. 1A and 1B are diagrams illustrating an exemplary implementation in which management of CDMA credentials on a smart card may be implemented. FIGS. 1A and 1B illustrate an exemplary environment 100. In practice, environment 100 may include more, fewer, different, and/or differently arranged devices and/or networks than those illustrated in FIGS. 1A and 1B. Additionally, or alternatively, in other implementations, one or more functions described as being performed by a particular device or network may be performed by a different device or a different network. Environment 100 may include wired and/or wireless connections between the networks and the devices illustrated. The connections between the devices and networks in environment 100 are exemplary, and in other implementations, the connections may be different.

As illustrated in FIG. 1A, a user 105 may operate a user device 110-1 (referred to generically as "user device 110"), which may include a smart card 115, and communicate via network 125. The term "user device," as used herein, is intended to be broadly interpreted to include a device that may utilize a smart card (e.g., smart card 115). User device 110 may correspond to a mobile device or a stationary device. By way of example, but not limited thereto, user device 110 may correspond to a wireless telephone (e.g., a smart phone or a cellular phone), a personal digital assistant (PDA), a pervasive computing device, a computer (e.g., a laptop computer, a palmtop computer), an Internet Protocol (IP) phone, a music playing device, a web browsing device, a personal navigation device (e.g., a Global Positioning System (GPS) navigation device), a multimedia playing device, a gaming device, a vehicle-based device, a television set-top-box, or the like.

Smart card 115 may correspond to a Subscriber Identity Module (SIM) card, a UICC, or another type of smart card. Smart card 115 may include an integrated circuit and facilitate the connection of user device 110 to network 125.

Network 125 may correspond to a network that provides one or more services. Network 125 may include, for example, a $2^{nd}$ Generation (2G) network (e.g., a Global System for Mobile communications (GSM) network), a $3^{rd}$ Generation (3G) network (e.g., a CDMA network), a $4^{th}$ Generation (4G) network (e.g., a Long Term Evolution (LTE) network), an evolved High Rate Packet Data (eHRPD) network, an HRPD network, an Internet Protocol (IP) Multimedia Subsystem (IMS) network, or the like.

In an exemplary scenario, user device 110-1 may establish a connection 120 with network 125. Smart card 115 may initiate an activation request 130 with network 125. In one implementation, activation request 130 may include an identifier for user device 110-1 and an identifier for user 105. For example, the identifier for user device 110-1 may include a unique identifier associated with user device 110-1 (e.g., an International Mobile Equipment Identity (IMEI)), and the identifier for user 105 may include a unique identifier associated with user 105 (e.g., an International Mobile Subscriber Identity (IMSI)). In other implementations, the identifier for user device 110 may correspond to a different type of user device identifier (e.g., a Mobile Equipment Identity (MEID), an Electronic Serial Number (ESN), or the like). Similarly, in other implementations, the identifier for user 105 may correspond to a different type of user identifier. In one implementation, user 105 and user device 110 identifiers may be incorporated with a fully qualified domain name (FQDN) (e.g., IMEI@vz4g.com or IMSI@vz3G.com).

In this scenario, it may be assumed that network 125 recognizes, for example, the identifier for user device 110-1, and responds with an activation response 135. In one implementation, activation response 135 may include a Mobile Station International Subscriber Directory Number (MSISDN), a Mobile Directory Number (MDN), a Mobile Identification Number (MIN), a CDMA A12 Network Access Identifier (NAI), a Preferred Roaming List (PRL), a Public Land Mobile Network (PLMN) identifier, and/or a CDMA Network Access NAI. The MSISDN may correspond to a unique identifier for a subscription in a GSM or UMTS network. The MDN may correspond to a directory number used to contact a user device. The MIN may correspond to an identifier that uniquely identifies a user device. The CDMA A12 NAI may correspond to a device access identifier (ID) to permit a user device to be authenticated. The PRL may correspond to information used during a system selection and acquisition process, such as information identifying the bands, sub-bands, and service provider identifiers to be scanned and in what order. The PLMN identifier may identify the network that user device 110-1 may utilize when roaming. The CDMA Network Access NAI may correspond to a subscriber NAI that may be used during an authentication process.

Generally, smart card 115 may push 140 CDMA credentials to user device 110-1. In one implementation, the CDMA credentials may include the MDN, the MIN, and the PRL. In another implementation, the CDMA credentials may include less information, additional information, or different information. For example, the CDMA credentials might include the CDMA A12 NAI and/or the CDMA Network Access NAI. When smart card 115 is removed from user device 110-1, the CDMA credentials may be removed from user device 110-1. In such an instance, user device 110-1 may not be able to operate with network 125 and/or a portion of network 125 (e.g., a CDMA portion of network 125, etc.).

Referring to FIG. 1B, assume that user 105 uses smart card 115 with user device 110-2, where user device 110-2 is a different user device than user device 110-1. In one implementation, smart card 115 may read 145 a user device 110-2 identifier (e.g., an IMEI) of user device 110-2, and user device 110-2 may read 150 a smart card identifier (e.g., an Integrated Circuit Card ID (ICC-ID) or some other unique identifier of smart card 115). Smart card 115 may compare the user device 110-2 identifier with a stored user device identifier. Similarly, user device 110-2 may compare the smart card identifier with its stored smart card identifier. In the event that the smart card identifier and the user device identifier match with what is stored on smart card 115 and user device 110-2, smart card 115 may push 140 CDMA credentials to user device 110-2. User 105 may utilize user device 110-2 with network 125 without a need for user intervention or any configuring/programming of user device 110-2. In the event that the smart card identifier and/or the user device identifier do not match with what is stored on smart card 115 and/or user device 110-2, smart card 115 may push 140 CDMA credentials to user device 110-2. Additionally, network 125 may need to be provisioned for user device 110-2, as will be described in detail below. However, user intervention still may not be needed.

As a result of the foregoing, CDMA credentials may reside on a smart card so that a user may change user devices and the CDMA credentials may follow without user intervention. Since implementations have been broadly described, variations to the above implementations will be discussed further below.

Figure 2:
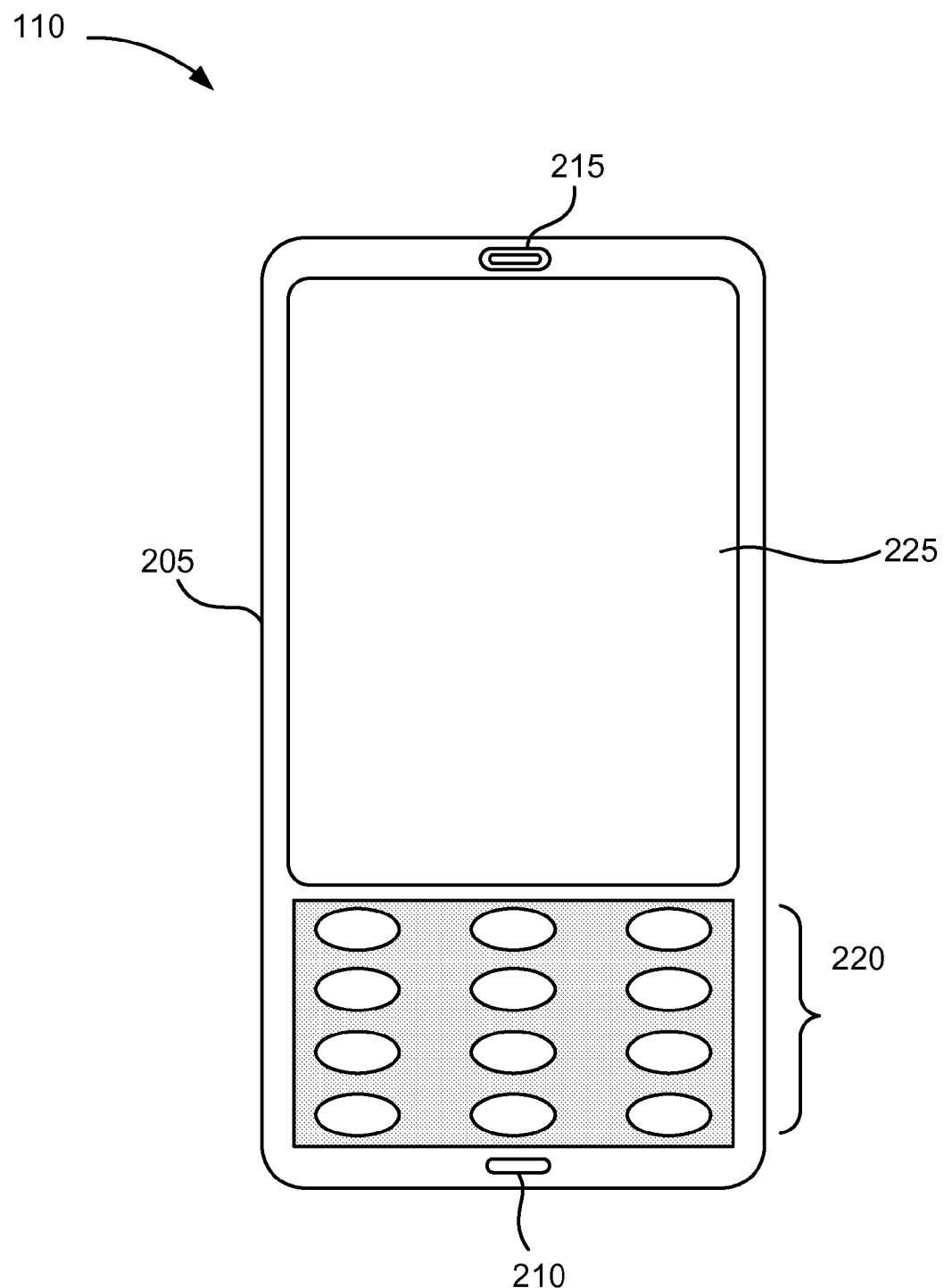
FIG. 2 is a diagram illustrating an exemplary user device depicted in FIGS. 1A and 1B.

FIG. 2 is a diagram of an exemplary user device 110. As illustrated in FIG. 2, user device 110 may include a housing 205, a microphone 210, a speaker 215, a keypad 220, and a display 225. In other implementations, user device 110 may include fewer, additional, and/or different components, and/or a different arrangement of components than those illustrated in FIG. 2 and described herein. For example, user device 110 may not include microphone 210, speaker 215, and/or keypad 220.

Housing 205 may include a structure to contain components of user device 110. For example, housing 205 may be formed from plastic, metal, or some other material. Housing 205 may support microphone 210, speakers 215, keypad 220, and display 225.

Microphone 210 may include an input device that converts a sound wave to a corresponding electrical signal. For example, the user may speak into microphone 210 during a telephone call or to execute a voice command. Speaker 215 may include an output device that converts an electrical signal to a corresponding sound wave. For example, the user may listen to music, listen to a calling party, or listen to other auditory signals through speaker 215.

Keypad 220 may include an input device that provides input into user device 110. Keypad 220 may include a standard telephone keypad, a QWERTY keyboard, and/or some other type or arrangement of keys. Keypad 220 may also include one or more special purpose keys. The user may utilize keypad 220 as an input component to user device 110. For example, the user may use keypad 220 to enter information, such as alphanumeric text, to access data, or to invoke a function or an operation.

Display 225 may include an output device that outputs visual content, and/or may include an input device that receives user input (e.g., a touch screen (also known as a touch display)). Display 225 may be implemented according to a variety of display technologies, including but not limited to, a liquid crystal display (LCD), a plasma display panel (PDP), a field emission display (FED), a thin film transistor (TFT) display, or some other type of display technology. Additionally, display 225 may be implemented according to a variety of sensing technologies, including but not limited to, capacitive sensing, surface acoustic wave sensing, resistive sensing, optical sensing, pressure sensing, infrared sensing, gesture sensing, etc. Display 225 may be implemented as a single-point input device (e.g., capable of sensing a single touch or point of contact) or a multipoint input device (e.g., capable of sensing multiple touches or points of contact that occur at substantially the same time).

Display 225 may also include an auto-rotating function that automatically orients content being displayed in correspondence to an orientation of display 225 and/or user device 110. For example, the auto-rotating function may automatically rotate content in a portrait mode or a landscape mode in correspondence to the orientation of display 225 and/or user device 110.

Display 225 may display text, images, and/or video to the user. Display 225 may also display a user interface (e.g., a graphical user interface (GUI)) of user device 110 or a user interface of some other device in which user device 110 controls, a user interface associated with applications, or the like. The user may utilize his or her finger or some other instrument (e.g., a stylus) to interact with display 225 (and user device 110).

Figure 3A:
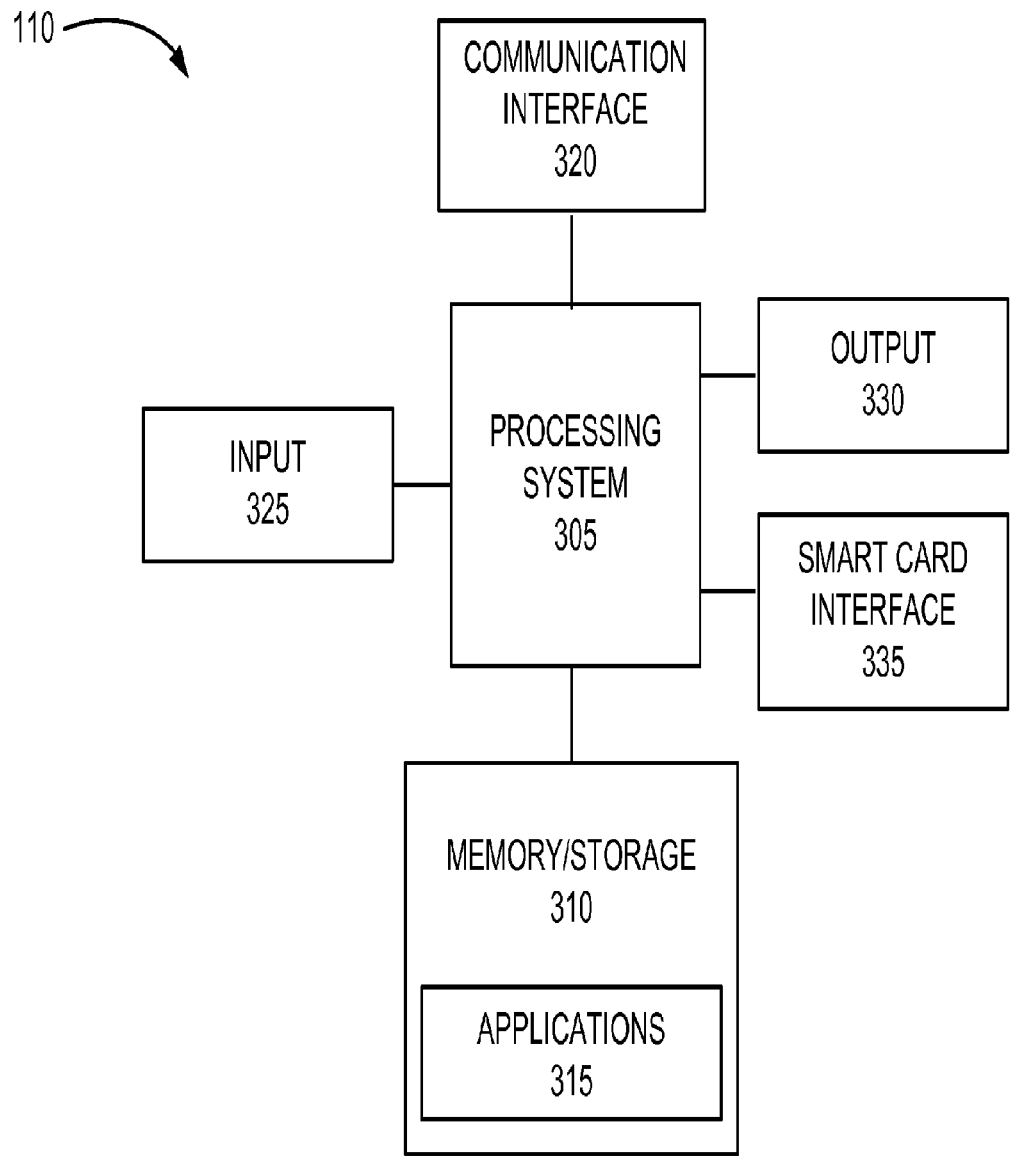
FIG. 3A is a diagram illustrating exemplary components of a user device.

FIG. 3A is a diagram illustrating exemplary components of user device 110. As illustrated, user device 110 may include a processing system 305, memory/storage 310 including applications 315, a communication interface 320, an input 325, an output 330, and a smart card interface 335. In other implementations, user device 110 may include fewer, additional, and/or different components, and/or a different arrangement of components than those illustrated in FIG. 3A and described herein. Additionally, in other implementations, some functions described as being performed by a particular component may be performed by a different component, or some combination thereof.

Processing system 305 may include one or more processors, microprocessors, data processors, co-processors, network processors, application specific integrated circuits (ASICs), controllers, programmable logic devices (PLDs), chipsets, field programmable gate arrays (FPGAs), and/or some other component that may interpret and/or execute instructions and/or data. Processing system 305 may control the overall operation, or a portion thereof, of user device 110, based on, for example, an operating system (not illustrated) and/or various applications (e.g., applications 315). Processing system 305 may access instructions from memory/storage 310, from other components of user device 110, and/or from a source external to user device 110 (e.g., a network or another device).

Memory/storage 310 may include memory and/or secondary storage. For example, memory/storage 310 may include a random access memory (RAM), a dynamic random access memory (DRAM), a read only memory (ROM), a programmable read only memory (PROM), a flash memory, and/or some other type of memory. Memory/storage 310 may include a hard disk (e.g., a magnetic disk, an optical disk, a magneto-optic disk, a solid state disk, etc.) or some other type of computer-readable medium, along with a corresponding drive. The term "computer-readable medium" is intended to be broadly interpreted to include a memory, a secondary storage, or the like. A computer-readable medium may correspond to, for example, a physical memory device or a logical memory device. A logical memory device may include memory space within a single physical memory device or spread across multiple physical memory devices.

Memory/storage 310 may store data, application(s), and/or instructions related to the operation of user device 110. For example, memory/storage 310 may include a variety of applications 315, such as, an e-mail application, a telephone application, a camera application, a voice recognition application, a video application, a multi-media application, a music player application, a visual voicemail application, a contacts application, a data organizer application, a calendar application, an instant messaging application, a texting application, a web browsing application, a location-based application (e.g., a GPS-based application), a blogging application, and/or other types of applications (e.g., a word processing application, a spreadsheet application, etc.).

Communication interface 320 may include a component that permits user device 110 to communicate with other devices, networks (e.g., network 125), and/or systems. For example, communication interface 320 may include some type of wireless and/or wired interface.

Input 325 may include a component that permits the user and/or another device to input information into user device 110. For example, input 325 may include a keypad (e.g., keypad 220), a button, a switch, a knob, fingerprint recognition logic, retinal scan logic, a web cam, voice recognition logic, a touchpad, an input port, a microphone (e.g., microphone 210), a display (e.g., display 225), and/or some other type of input component. Output 330 may include a component that permits user device 110 to output information to the user and/or another device. For example, output 330 may include a display (e.g., display 225), light emitting diodes (LEDs), an output port, a speaker (e.g., speaker 215), and/or some other type of output component.

Smart card interface 335 may provide an interface between user device 110 and smart card 115. For example, UICC interface 335 may include a component to permit communication between user device 110 and smart card 115 when smart card 115 is inserted in user device 110.

As described herein, user device 110 may perform certain operations in response to processing system 305 executing software instructions contained in a computer-readable medium, such as memory/storage 310. The software instructions may be read into memory/storage 310 from another computer-readable medium or from another device via communication interface 320. The software instructions contained in memory/storage 310 may cause processing system 305 to perform processes described herein. Alternatively, hardwired circuitry may be used in place of or in combination with software instructions to implement processes described herein. Thus, implementations described herein are not limited to any specific combination of hardware circuitry and software.

Figure 3B:
FIG. 3B is a diagram illustrating an exemplary functional component of the user device.

FIG. 3B is a diagram illustrating an exemplary functional component associated with user device 110. As illustrated in FIG. 3B, user device 110 may include a smart card manager 340. Smart card manager 340 may be implemented as a combination of hardware and software based on the components illustrated and described with respect to FIG. 3A. Alternatively, smart card manager 340 may be implemented as hardware based on the components illustrated and described with respect to FIG. 3A.

Smart card manager 340 may manage the sending of information to smart card 115, the receiving of information from smart card 115, and/or the processing of information related to smart card 115, as well as other processes associated with the utilization of smart card 115, as described below. For example, smart card manager 340 may receive, from smart card 115, CDMA credentials and provide them to user device 110 so that user device 110 may connect to and/or utilize network 125. Additionally, as previously described, when smart card 115 is removed from user device 110, smart card manager 340 may ensure that the CDMA credentials are removed from user device 110.

As will be described in greater detail below, when smart card 115 is connected with user device 110, a recognition process may occur. For example, in one implementation, when smart card 115 is placed in user device 110, smart card 115 may read an identifier (e.g., an IMEI) associated with user device 110. Smart card manager 340 may read an identifier (e.g., an ICCID) associated with smart card 115. Smart card 115 may compare the user device 110 identifier with a previously stored user device identifier, if any. Similarly, smart card manager 340 may compare the smart card 115 identifier with a previously stored smart card identifier, if any. In the event that the smart card 115 identifier matches a previously stored smart card identifier and the user device 110 identifier matches a previously stored user device identifier, smart card 115 may push the CDMA credentials to smart card manager 340. User 105 may utilize user device 110 with network 125 without a need for user intervention and without the need to configure/program user device 110.

In other instances, however, when smart card manager 340 and smart card 115 perform their respective comparisons, other outcomes may occur. For example, the user device 110 identifier may match a previously stored user device identifier, but the smart card 115 identifier may not match a previously stored smart card identifier. In another example, the user device 110 identifier may not match a previously stored user device identifier and the smart card 115 identifier may not match a previously stored smart card identifier. In either of these instances, in one implementation, smart card 115 may still push the CDMA credentials to smart card manager 340. However, network devices, in network 125, may need to be provisioned to permit user 105, user device 110, and/or smart card 115 to partake of services and/or resources in network 125, as will be described in greater detail below.

Figure 4A:
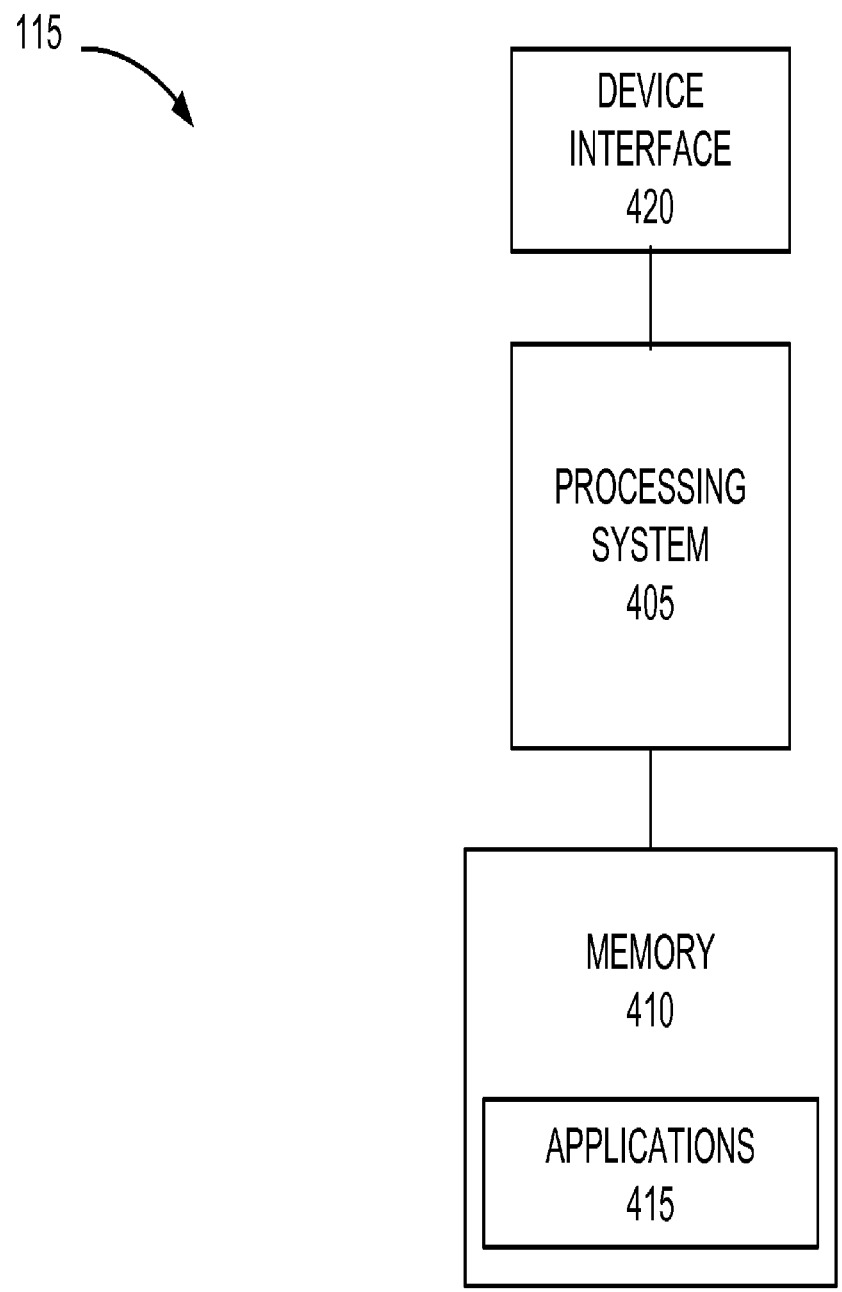
FIG. 4A is a diagram illustrating exemplary components of a smart card.

FIG. 4A is a diagram illustrating exemplary components of smart card 115. As illustrated, smart card 115 may include a processing system 405, a memory 410 including applications 415, and a device interface 420. In other implementations, smart card 115 may include fewer, additional, and/or different components, and/or a different arrangement of components than those illustrated in FIG. 4A and described herein.

Processing system 405 may include one or more processors, microprocessors, data processors, co-processors, network processors, ASICs, controllers, PLDs, chipsets, FPGAs, and/or some other component that may interpret and/or execute instructions and/or data. Processing system 405 may control the overall operation, or a portion thereof, of smart card 115, based on, for example, an operating system (not illustrated) and/or various applications (e.g., applications 415). Processing system 405 may access instructions from memory 410, from other components of smart card 115, and/or from a source external to smart card 115 (e.g., user device 110).

Memory 410 may include a memory device. For example, memory 410 may include a RAM, a DRAM, a ROM, a PROM, an electrically erasable PROM (EEPROM), a flash memory, and/or some other type of memory. Memory 410 may store data, applications 415, and/or instructions related to the operation of smart card 115.

Applications 415 may include applications associated with various network standards, such as GSM, CDMA, LTE, IMS, Universal Mobile Telecommunication System (UMTS), etc.

Device interface 420 may include an interface between user device 110 and smart card 115. For example, device interface 420 may include electronic circuitry to permit communication between user device 110 and smart card 115 when smart card 115 is inserted in user device 110. Device interface 420 may serve as an input/output mechanism for smart card 115.

Figure 4B:
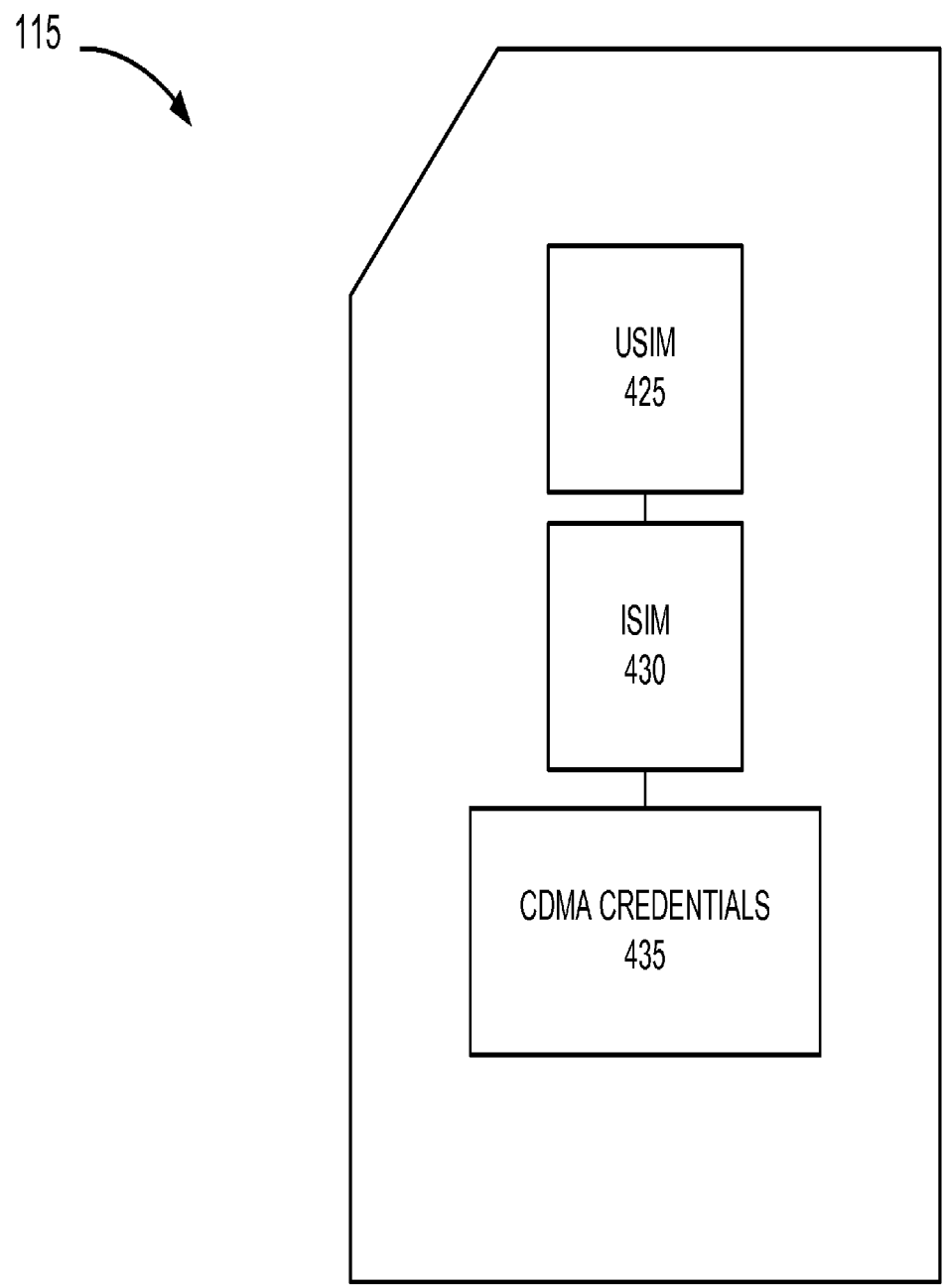
FIG. 4B is a diagram illustrating exemplary functional components of the smart card.

FIG. 4B is a diagram illustrating exemplary functional components of smart card 115. The functional components may be implemented based on the components illustrated and described with respect to FIG. 4A. As illustrated, smart card 115 may include a Universal Subscriber Identity Module (USIM) 425, an IP Multimedia Services Identity Module (ISIM) 430, and CDMA credentials module 435. In other implementations, smart card 115 may include fewer, additional, and/or different functional components, and/or a different arrangement of functional components than those illustrated in FIG. 4B and described herein. Additionally, or alternatively, in other implementations, additional, fewer, and/or different types of information may be stored by a particular component than the information described herein.

USIM 425 may correspond to an application (e.g., applications 415) that stores subscriber information and/or authentication information which may be utilized when user device 110 connects to and/or utilizes network 125. For example, USIM 425 may store GSM authentication information (e.g., an Authentication and Key Agreement (AKA) key), an IMSI, and/or a MSISDN. USIM 425 may also store a PLMN identifier.

ISIM 430 may correspond to an application (e.g., application 415) that stores authentication information and/or other types of information which may be utilized when user device 110 connects to and/or utilizes network 125. For example, ISIM 430 may store an AKA key, and a Session Initiation Protocol (SIP) Uniform Resource Indicator (URI) (e.g., a SIP URI of an Interrogating Call Session Control Function (I-CSCF)). ISIM 430 may also store a telephone uniform resource identifier (URI) (e.g., a global telephone number).

CDMA credentials module 435 may store CDMA credential information. CDMA credentials module 435 may also store other types of information which may be utilized when user device 110 connects to and/or utilizes network 125. For example, CDMA credentials module 435 may store a MDN, a MIN, a CDMA A12 NAI, a CDMA Network Access NAI, a PRL, and/or an IMEI associated with user device 110. CDMA credentials module 435 may also store an FQDN.

Figure 5:
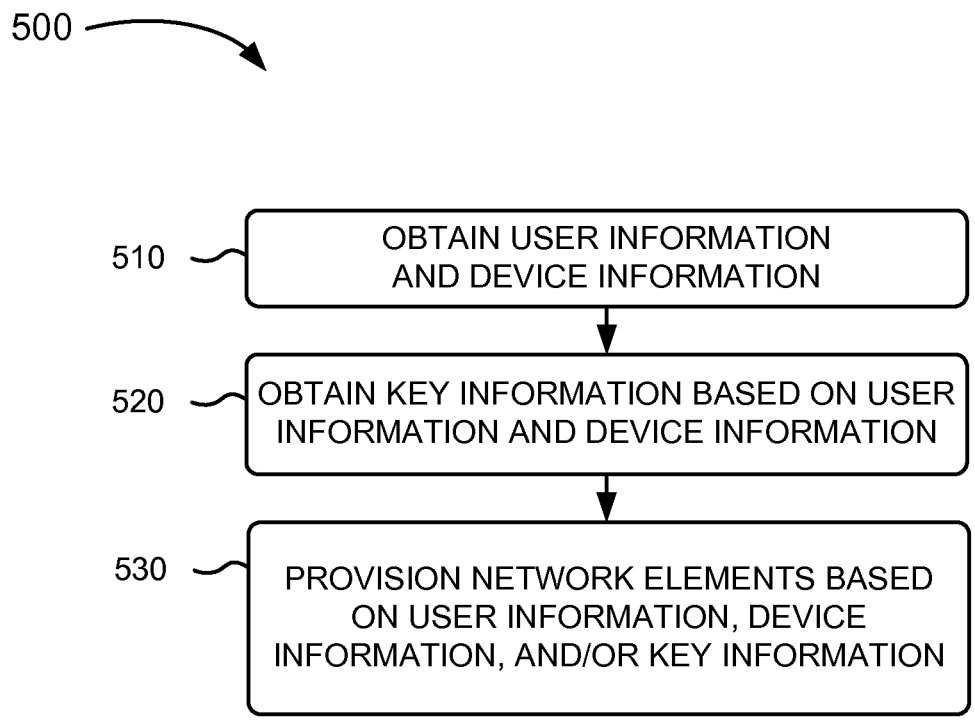
FIG. 5 is a flowchart of an exemplary process for provisioning network devices in a network.

Prior to activation of smart card 115, network 125 may provision certain network devices so that network 125 may provide services and/or resources to user 105. FIG. 5 is a flowchart of an exemplary process 500 for provisioning network devices in network 125. Process 500 may include obtaining user information and device information (block 510). When a user (e.g., user 105) registers a user device (e.g., user device 110) with a service provider (e.g., a communications service provider), the service provider may obtain certain information regarding user 105 and user device 110. For example, the service provider may obtain the MSISDN, the MIN, the IMSI, and/or the IMEI associated with user 105 and/or user device 110.

Key information may be obtained based on the user information and the device information (block 520). For example, one or more network devices, responsible for issuing keys (e.g., authentication keys), may identify and associate one or more keys with user 105 and/or user device 110. The one or more keys might include one or more AKA keys, over-the-air (OTA) keys, and/or A-keys. Each of these keys may be used for later authentication of user 105 and/or user device 110.

Network devices may be provisioned based on the user information, the device information, and/or the key information (block 530). To permit user device 110 to partake of services and/or resources in network 125, certain network devices may be provisioned to recognize user 105 and/or user device 110 and facilitate user 105 and/or user device 110 obtaining these services and/or resources.

Figure 6:
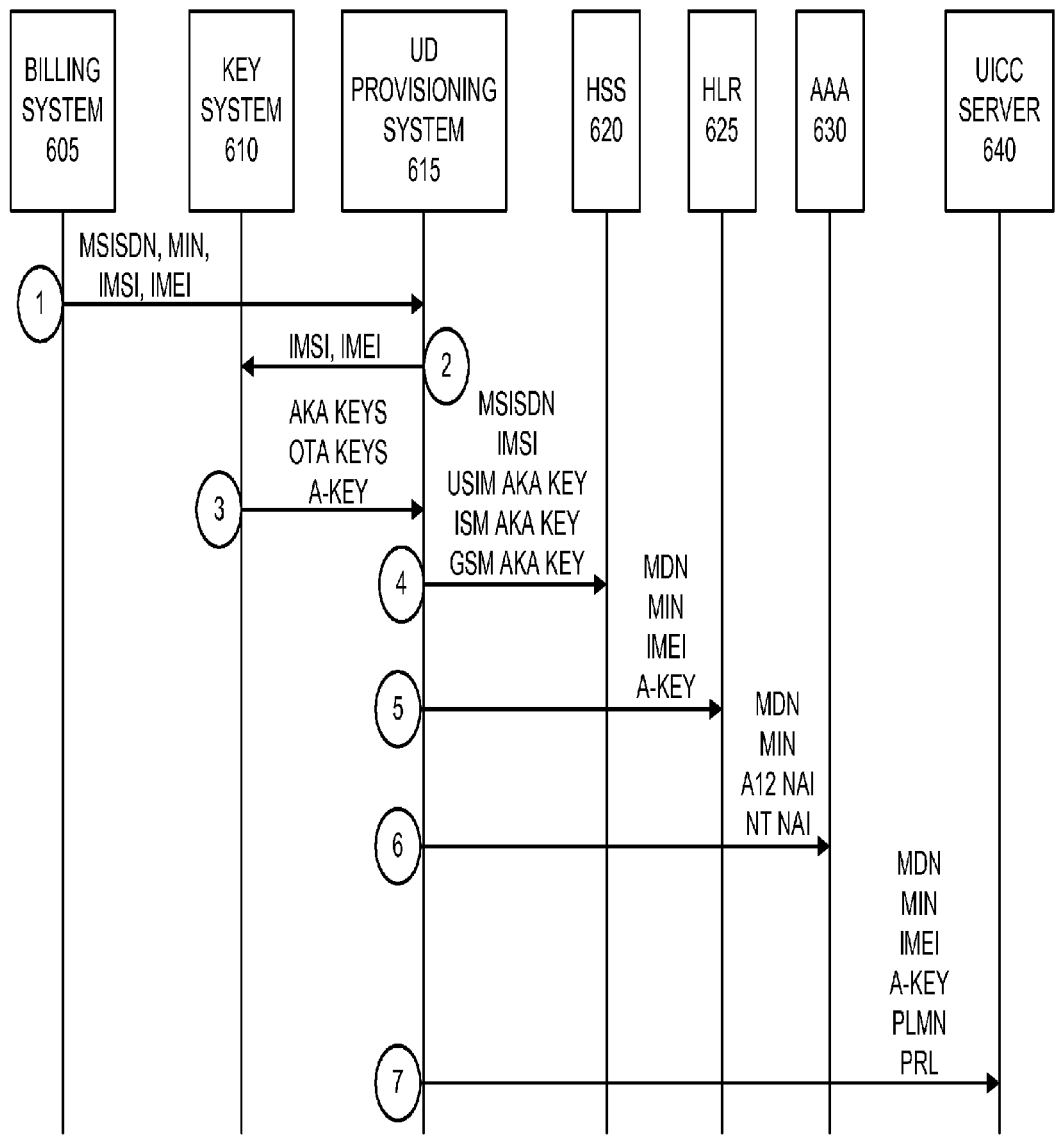
FIG. 6 is a diagram illustrating an exemplary messaging scheme for provisioning network devices prior to activation of a smart card.

FIG. 6 is a diagram illustrating an exemplary messaging scheme for provisioning network devices prior to activation of smart card 115. The network devices may be associated with network 125. As illustrated in FIG. 6, network 125 may include a billing system 605, a key system 610, a user device (UD) provisioning system 615, a home subscriber server (HSS) 620, a home location register (HLR) 625, an authentication, authorization, and accounting device (AAA) 630, and a UICC server 640. In other implementations, network 125 may include additional, fewer, and/or different network devices than those illustrated and described with respect to FIG. 6. For example, when network 125 includes a GSM network and a CDMA network, the network devices may be different from when network 125 includes a CDMA network and an LTE network. Additionally, or alternatively, in other implementations, the information exchanged between the network devices may be different. Additionally or alternatively, in other implementations, one or more functions described as being performed by a particular network device may be performed by a different network device.

Billing system 605 may correspond to a device that manages billing with respect to users. Key system 610 may correspond to a device that stores, manages, and/or maintains keys (e.g., authentication keys). UD provisioning system 615 may include a device that provisions network devices in network 125 so that network 125 may serve users 105, user devices 110, and/or smart cards 115. HSS 620 may correspond to a device that manages user profile information. HSS 620 may include, or be associated with, an HLR and/or an AAA. In one implementation, HSS 620 may be associated with a GSM network, an LTE network, a $3^{rd}$ Generation Partnership Project (3GPP) network, or the like. HLR 625 may correspond to a device that manages location information associated with users 105. In one implementation, HLR 625 may be associated with a CDMA network, a 3GPP2 network, or the like. AAA 630 may correspond to a device that provides authentication, authorization, and accounting services. In one implementation, AAA 630 may be associated with a CDMA network, a 3GPP2 network, or the like. UICC server 640 may include a device that manages an activation of smart card 115.

As illustrated in FIG. 6, billing system 605, key system 610, UD provisioning system 615, HSS 620, HLR 625, AAA 630, and UICC server 640 may exchange various types of information to provision network 125 prior to smart card 115 being activated and recognized by network 125. For example, billing system 605 may initiate the process by sending a message, containing information associated with user 105, user device 110, and/or smart card 115, to UD provisioning system 615, as shown as (1) in FIG. 6. In one implementation, the information, associated with user 105 and/or user device 110, may include the MSISDN, the MIN, the IMSI, and/or the IMEI.

UD provisioning system 615 may receive the message from billing system 605, and coordinate the provisioning of other network devices in network 125. For example, UD provisioning system 615 may send a message to key system 610, as shown as (2) in FIG. 6. In one implementation, the message, from UD provisioning system 615, may include the IMSI and/or the IMEI. In response to the message, key system 610 may identify one or more keys, such as one or more AKA keys, over-the-air (OTA) keys, and/or A-keys, and associate the one or more keys with user 105 and/or user device 110. Each of these keys may be used for later authentication of user 105 and/or user device 110. Key system 610 may send a response message to UD provisioning system 615 with the one or more AKA keys, OTA keys, and/or A-keys, as shown as (3) in FIG. 6.

UD provisioning system 615 may, in turn, provision HSS 620, HLR 625, AAA 630, and UICC server 640. For example, UD provisioning system 615 may send a message to HSS 620, as shown as (4) in FIG. 6. In one implementation, this message, to HSS 620, may include the MSISDN, the IMSI, and/or USIM, ISM, and/or GSM AKA keys. HSS 620 may record the information contained within the message and/or perform one or more processes necessary to associate the information with user 105 and/or user device 110 to facilitate utilization of network 125.

UD provisioning system 615 may also send a message to HLR 625, as shown as (5) in FIG. 6. In one implementation, this message, to HLR 625, may include the MDN, the MIN, the IMEI, and the A-key. HLR 620 may record the information contained within the message and/or perform one or more processes necessary to associate the information with user 105 and/or user device 110 to facilitate utilization of network 125.

UD provisioning system 615 may also send a message to AAA 630, as shown as (6) in FIG. 6. In one implementation, this message, to AAA 630, may include the MDN, the MIN, the CDMA A12 NAI, and/or the CDMA network access NAI. AAA 630 may record the information contained within the message and/or perform one or more processes necessary to associate the information with user 105 and/or user device 110 to facilitate utilization of network 125.

UD provisioning system 615 may also send a message to UICC server 640, as shown as (7) in FIG. 6. In one implementation, the message, to UICC server 640, may include the MDN, the MIN, the IMEI, the A-key, the PLMN identifier, and/or the PRL. UICC server 640 may record the information contained within the message and/or perform one or more processes necessary to associate the information with user 105 and/or user device 110 to facilitate utilization of network 125.

Based on the foregoing, network devices, in network 125, may be provisioned so that network 125 may provide services and/or resources to user 105 and/or user device 110. Once network devices, in network 125, have been provisioned, smart card 115, of user device 110, may be activated so that user device 110 may partake of services and/or resources in network 125.

Figure 7:
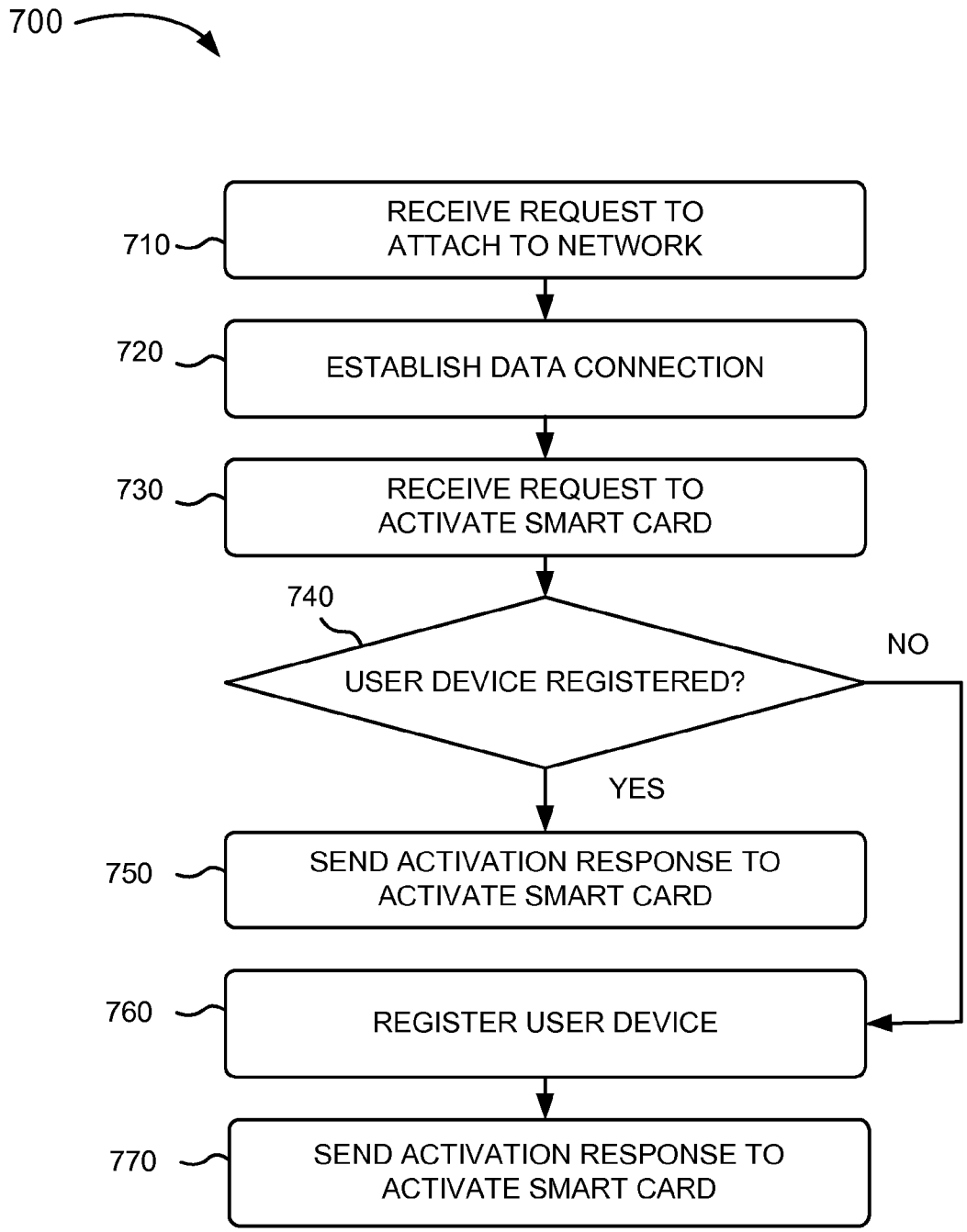
FIG. 7 is a flowchart of an exemplary process for activating a smart card.

FIG. 7 is a flow chart of a process 700 for activating smart card 115. Process 700 may be performed by one or more network devices, in network 125, in communication with user device 110 and/or smart card 115. Examples of these network devices are described below in connection with FIGS. 8-10.

Process 700 may include receiving a request to attach to network 125 (block 710). For example, user device 110 may send an attachment request to a first network device. This may occur when user 105 powers on, or otherwise activates, user device 110. In one implementation, user device 110 may send an attachment request message that might include information associated with user 105 and/or user device 110, such as the IMSI. The first network device may process the attachment request, and, if user 105 and/or user device 110 is recognized (e.g., is a registered user and/or user device), permit user device to attach to network 125.

A data connection may be established (block 720). For example, user device 110 may send a request to establish a data connection with a second network device. After processing the request, the second network device may permit a data connection, such as an IP connection, to be established with user device 110.

A request to activate smart card 115 may be received (block 730). For example, smart card 115 may send an activation request to a third network device. The activation request may include information associated with user 105 and/or user device 110, such as the IMSI and/or the IMEI. In one implementation, the IMSI and the IMEI may be incorporated with a FQDN (e.g., IMSI@vz3G.com and IMEI@vz4g.com).

It may be determined whether user device 110 is registered (block 740). In one implementation, the third network device may determine whether user device 110 is registered by comparing the IMEI, received from smart card 115, to a set of stored IMEIs, corresponding to a set of user devices with which the third network device has previously communicated. The third network device may conclude that a user device 110 is registered if the received IMEI matches an IMEI in the stored set of IMEIs.

If user device 110 is registered (block 740—YES), then an activation response may be sent to activate smart card 115 (block 750). In one implementation, the activation response may include information that user device 110 may use to partake of services and/or resources in network 125. The information, in the activation response, may include, for example, the MSISDN, the MIN, the CDMA A12 NAI, the PRL, the PLMN identifier, and/or the CDMA network access NAI. Smart card 115 may store this information in its memory (e.g., memory 410 (FIG. 4A)) and/or push some or all of the information (e.g., the CDMA credentials) to user device 110. Accordingly, smart card 115 may be activated. Thereafter, user device 110 may use information in/from smart card 115 to partake in services and/or resources on network 125.

If user device 110 is not registered (block 740—NO), then user device 110 may be registered (block 760). For example, the third network device may cause one or more other network devices to store information associated with user device 110, authenticate user 105 and/or user device 110, and/or perform one or more other functions to register user device 110.

Once user device 110 is registered, then an activation response may be sent to activate smart card 115 (block 770). In one implementation, the activation response may include information that user device 110 may use to partake of services and/or resources in network 125. The information, in the activation response, may include, for example, the MSISDN, the MIN, the CDMA A12 NAI, the PRL, the PLMN identifier, and/or the CDMA network access NAI. Smart card 115 may store this information in its memory (e.g., memory 410 (FIG. 4A)) and/or push some or all of the information (e.g., the CDMA credentials) to user device 110. Accordingly, smart card 115 may be activated. Thereafter, user device 110 may use information in/from smart card 115 to partake in services and/or resources on network 125.

Figure 8:
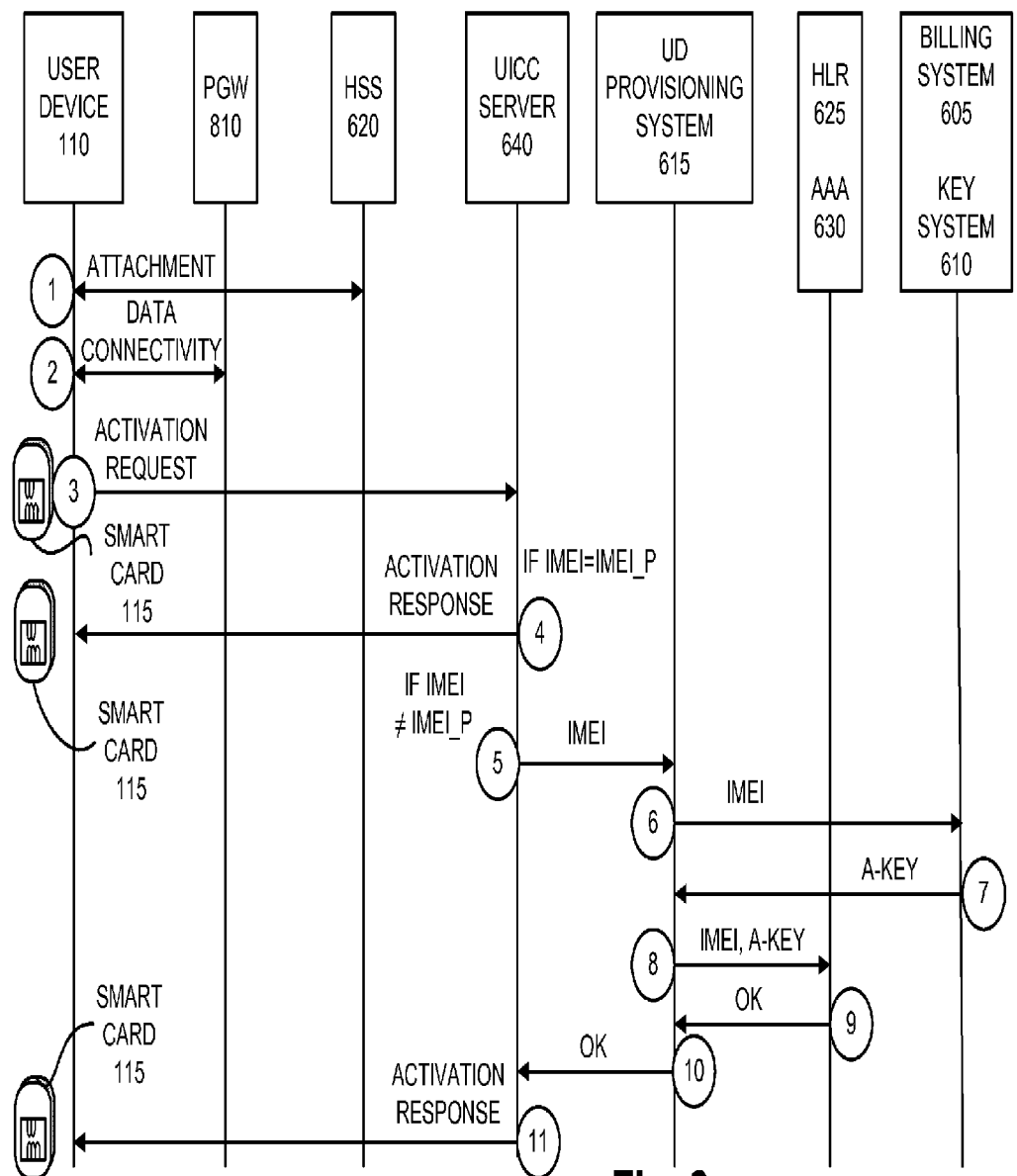
FIG. 8 is a diagram illustrating an exemplary messaging scheme associated with an activation procedure for a smart card when Long Term Evolution (LTE) coverage is provided in the network.

FIG. 8 is a diagram illustrating an exemplary messaging scheme for associated with an activation procedure for smart card 115 when LTE coverage is provided in network 125. In this example, network 125 may include network devices previously illustrated and described with respect to FIG. 6. Additionally, network 125 may include a packet gateway (PGW) 810. PGW 810 may serve as a gateway to and from packet networks (e.g., the Internet or other IP-based networks) and is typically associated with an LTE network.

As illustrated in FIG. 8, user device 110 may send an attachment request to HSS 620, as shown as (1) in FIG. 8. In one implementation, the attachment request may include an IMSI associated with user 105. HSS 620 may determine whether to accept the attachment request based on the IMSI. User device 110 may establish a data connection with PGW 810, as shown as (2) in FIG. 8. For example, user device 110 may send a request, to PGW 810, to establish an IP connection, and PGW 810 may process the request. Although not shown in FIG. 8, the data connection may be used for other communication to/from user device 110.

Smart card 115 may transmit an activation request to UICC server 640, as shown as (3) in FIG. 8. In one implementation, the activation request may include the IMEI and the IMSI associated with user device 110 and user 105, respectively. Additionally, in one implementation, the IMEI and the IMSI may be incorporated with a FQDN (e.g., IMEI@vz4g.com and IMSI@vz3G.com).

In one implementation, UICC server 640 may determine whether user device 110 is registered. For example, UICC server 640 may compare the received IMEI, included in the activation request, with IMEIs that UICC server 640 may store in accordance with a previous provisioning, as described with regard to FIG. 6. As illustrated, if the received IMEI matches an already provisioned IMEI (IMEI_P) (i.e., IMEI=IMEI_P), UICC server 640 may send an activation response to smart card 115, as shown as (4) in FIG. 8. In one implementation, the activation response may include the MSISDN, the MIN, the CDMA A12 NAI, the PRL, the PLMN identifier, and/or the CDMA network access NAI. Smart card 115 may store this information in its memory (e.g., memory 410 (FIG. 4A) and/or push some or all of the information (e.g., the CDMA credentials) to user device 110. Accordingly, smart card 115 may be activated. Thereafter, user device 110, containing smart card 115, may partake in services and/or resources on network 125.

On the other hand, if the received IMEI does not match an already provisioned IMEI (i.e., IMEI≠IMEI_P), then to be able to activate smart card 115, UICC server 640 may register user device 110 with other network devices. For example, UICC server 640 may send a request for UD provisioning system 615 to register user device 110, as shown as (5) in FIG. 8. In one implementation, the request may include the IMEI associated with user device 110.

UD provisioning system 615 may send a message to billing system 605 and/or key system 610 instructing these devices to register user device 110, as shown as (6) in FIG. 8. In response to the message, from UD provisioning system 615, billing system 605 may perform one more functions to register user device 110, and key system 610 may identify the A-key associated with user device 110. Key system 610 may send a response message to UD provisioning system 615, as shown as (7) in FIG. 8. In one implementation, the response message may include an A-key identified by key system 610. Billing system 605 may also send a response message to UD provisioning system 615, although this aspect is not shown in FIG. 8.

UD provisioning system 615 may receive the A-key and send a message to HLR 625 and/or AAA 630 instructing these devices to register user device 110, as shown as (8) in FIG. 8. In one implementation, the message, to HLR 625 and/or AAA 630, may include the IMEI and the A-key. HLR 625 may perform one more functions to register user device 110, and AAA 630 may perform an authentication operation based on the IMEI and the A-key. AAA 630 may return a response message to UD provisioning system 615, as shown as (9) in FIG. 8. Upon successful authentication by AAA 630, the response message, to UD provisioning system 615, may include an indication of successful authentication (e.g., OK). Upon unsuccessful authentication by AAA 630, the response message, to UD provisioning system 615, may include an indication of an unsuccessful authentication (e.g., FAIL). HLR 625 may also send a response message to UD provisioning system 615, although this aspect is not shown in FIG. 8.

UD provisioning system 615 may receive the response message from AAA 630 and return a response message to UICC server 640, as shown as (10) in FIG. 8. If the registration process was successful (e.g., an A-key is received from key system 610, an OK indication in received from AAA 630, etc.), the response message, to UICC server 640, may include an indication of successful registration (e.g., OK). If the registration process was unsuccessful, the response message, to UICC server 640, may include an indication of an unsuccessful registration (e.g., FAIL).

UICC server 640 may send an activation response to smart card 115, as shown as (11) in FIG. 8. If the registration was unsuccessful, the activation response may indicate a failure. If the registration was successful, the activation response may include the MSISDN, the MIN, the CDMA A12 NAI, the PRL, the PLMN identifier, and/or the CDMA network access NAI. Smart card 115 may store this information in its memory (e.g., memory 410 (FIG. 4A) and/or push some or all of the information (e.g., the CDMA credentials) to user device 110. Accordingly, smart card 115 may be activated. Thereafter, user device 110, containing smart card 115, may partake in services and/or resources on network 125.

Figure 9:
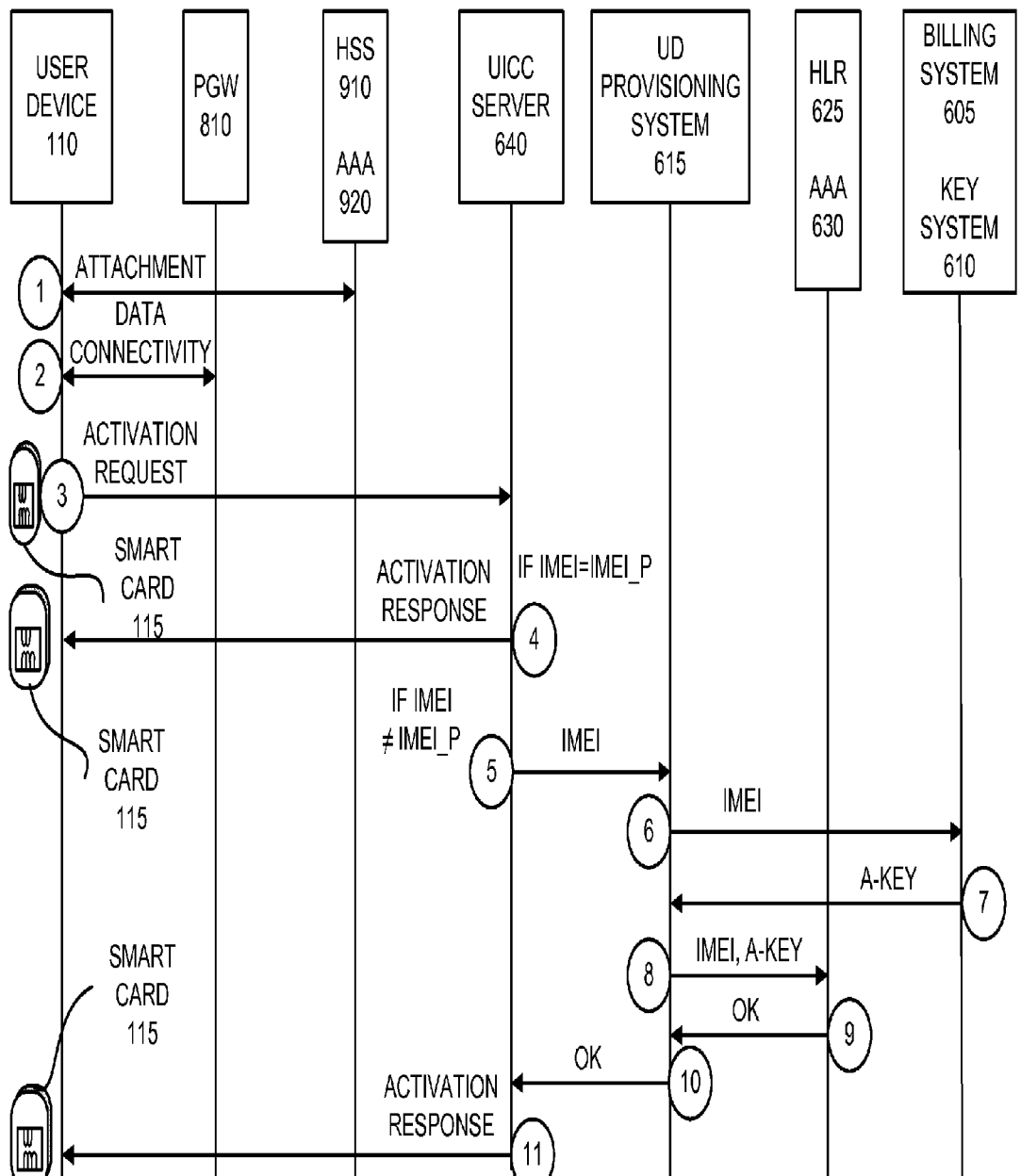
FIG. 9 is a diagram illustrating an exemplary messaging scheme associated with an activation procedure for a smart card when evolved High Rate Packet Data (eHRPD) coverage is provided in the network.

FIG. 9 is a diagram illustrating an exemplary messaging scheme associated with an activation procedure for smart card 115 when eHRPD coverage is provided in network 125. In this example, network 125 may include network devices previously illustrated and described with respect to FIGS. 6 and 8. In FIG. 9, however, HSS 620 may be replaced with one or more 3GPP devices, such as HSS 910 and/or AAA 920. HSS 910 may correspond to a device that manages user profile information. AAA 920 may correspond to a device that provides authentication, authorization, and accounting services.

The activation procedure of FIG. 9 may be similar to the activation procedure described above with regard to FIG. 8. In the activation procedure of FIG. 9, however, when user device 110 sends an attachment request, as shown as (1) in FIG. 9, user device 110 may send the attachment request to HSS 910 and/or AAA 920. In one implementation, the attachment request may include the IMSI associated with user 105 and a NAI. HSS 910 may perform a function relating to the attachment of user device 110 to network 125. AAA 920 may perform an authentication function relating to user device 110. Based on a result of the function performed by HSS 910 and/or AAA 920, HSS 910 and/or AAA 920 may determine whether to accept the attachment request.

Figure 10:
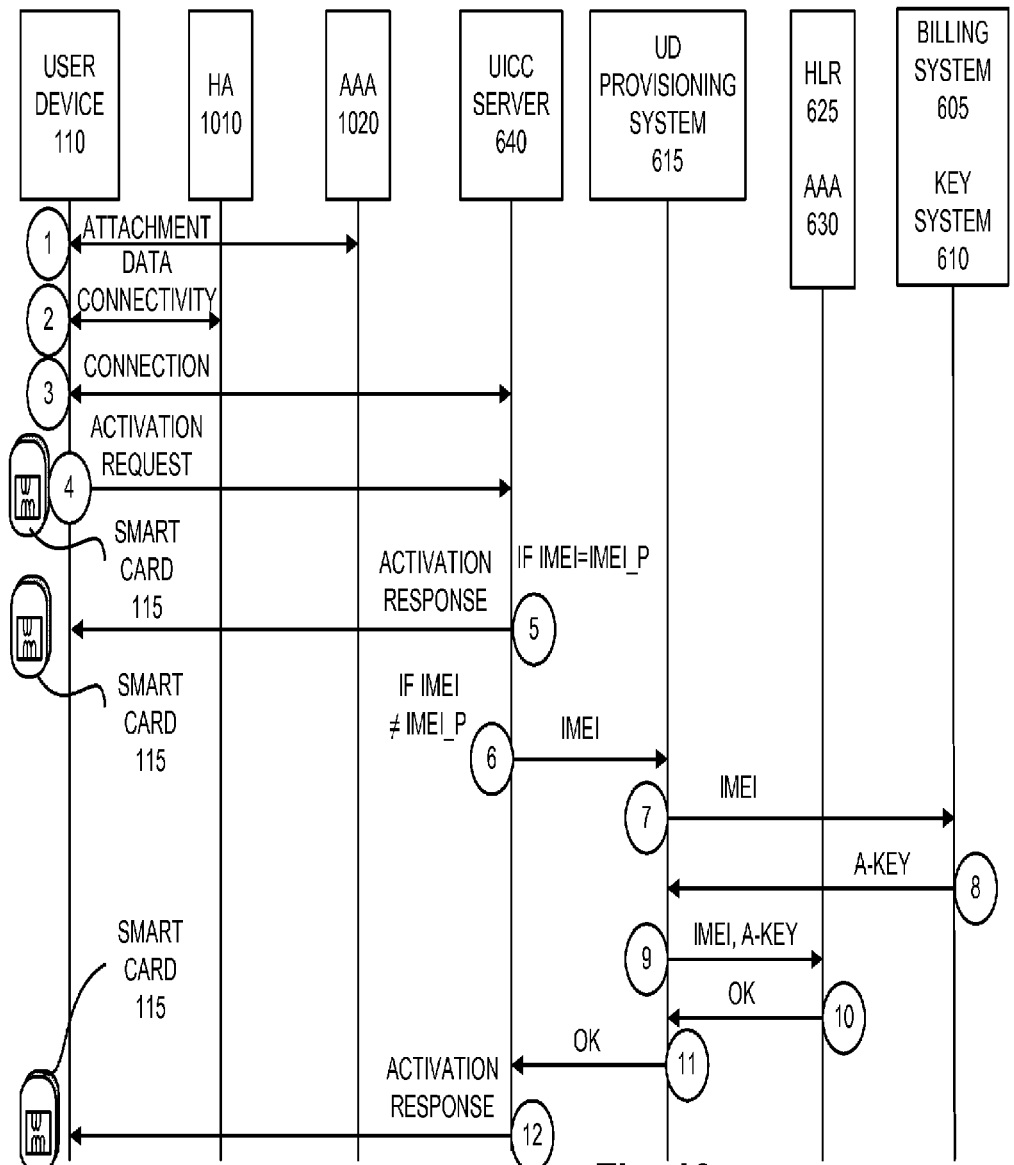
FIG. 10 is a diagram illustrating an exemplary messaging scheme associated with an activation procedure for a smart card when 1X Radio Transmission Technology (RTT) (1XRTT) and HRPD coverage is provided in the network.

FIG. 10 is a diagram illustrating an exemplary messaging scheme associated with an activation procedure for smart card 115 when 1X Radio Transmission Technology (RTT) (1XRTT) and HRPD coverage is provided in network 125. In this example, network 125 may include network devices previously illustrated and described with respect to FIGS. 6 and 8. Additionally, network 125 may include a home agent (HA) 1010 and an AAA 1020. HA 1010 may correspond to a device that routes data to user device 110 when user device 110 is attached to a network other than network 125. For example, HA 1010 may correspond to an anchor point. AAA 1020 may correspond to a device that provides authentication, authorization, and accounting services.

The activation procedure of FIG. 10 may be similar to the activation procedure described above with regard to FIG. 8. In the activation procedure of FIG. 10, however, when user device 110 sends an attachment request, as shown as (1) in FIG. 10, user device 110 may send the attachment request to AAA 1020. In one implementation, AAA 1020 may perform an attachment procedure using authentication bypass. AAA 1020 may determine whether to accept the attachment request based on a result of the attachment procedure.

User device 110 may establish a data connection with HA 1010, as shown as (2) in FIG. 10. For example, user device 110 may send a request, to HA 1010, to establish an IP connection, and HA 1010 may process the request. User device 110 may also establish a connection with UICC server 540, as shown as (3) in FIG. 10. In one implementation, this connection may be hot-lined.

The rest of the activation procedure of FIG. 10 may be similar to the activation procedure described above with regard to FIG. 8.

Figure 11:
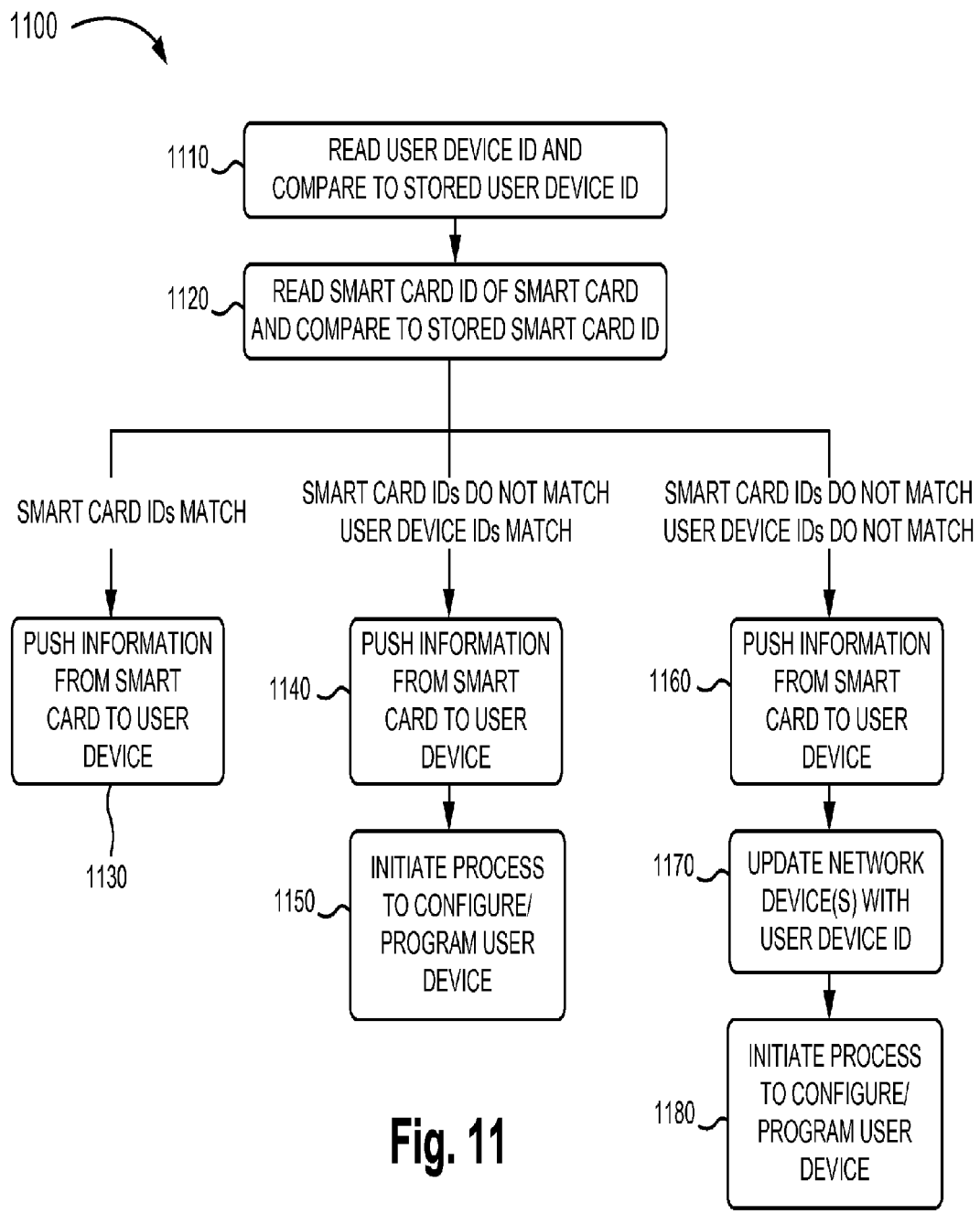
FIG. 11 is a flowchart of an exemplary process that may occur when a smart card is moved from one user device to another user device.

FIG. 11 is a flowchart of an exemplary process 1100 that may occur when a smart card is moved from one user device to another user device. For example, with reference to FIGS. 1A and 1B, assume that user 105 removes smart card 115 from user device 110-1 and inserts smart card 115 into user device 110-2. Process 1100 may be performed by user device 110-2, smart card 115, or a combination of user device 110-2 and smart card 115.

Process 1100 may include reading a user device identifier and comparing the user device identifier to a stored user device identifier (block 1110). For example, once inserted into user device 110-2, smart card 115 may read (or otherwise obtain) a user device identifier (e.g., the IMEI) associated with user device 110-2. Smart card 115 may obtain the user device identifier by, for example, reading the user device identifier from a particular memory location within user device 110-2 or requesting user device 110-2 to provide the user device identifier. Smart card 115 may also determine a user device identifier (IMEI_S) of the last user device 110 with which smart card 115 was associated. For example, as described above, CDMA credentials module 435 (FIG. 4B) may store a user device identifier of a user device 110 with which smart card 115 is associated. Smart card 115 may compare the user device identifier (e.g., the IMEI) with the stored user device identifier (e.g., IMEI_S) to determine whether they match (e.g., whether IMEI=IMEI_S). In an alternative implementation, rather than smart card 115 reading the user device identifier and performing the comparison, one or both of these operations may be performed by user device 110-2.

A smart card identifier may be read and compared to a stored smart card identifier (block 1120). For example, once inserted into user device 110-2, user device 110-2 may read (or otherwise obtain) a smart card identifier (e.g., the ICCID) associated with smart card 115. User device 110-2 may obtain the smart card identifier by, for example, reading the smart card identifier from a particular memory location within smart card 115 or requesting smart card 115 to provide the smart card identifier. User device 110-2 may also determine a smart card identifier (ICCID_S) of the last smart card 115 inserted into user device 110-2. For example, user device 110-2 may store a smart card identifier associated with a smart card 115 that has been inserted into user device 110-2. User device 110-2 may compare the smart card identifier (e.g., the ICCID) with the stored smart card identifier (e.g., ICCID_S) to determine whether they match (e.g., whether ICCID=ICCID_S). In an alternative implementation, rather than user device 110-2 reading the smart card identifier and performing the comparison, one or both of these operations may be performed by smart card 115.

If the smart card identifiers match (i.e., ICCID=ICCID_S), then information from smart card 115 may be pushed to user device 110-2 (block 1130). For example, if the smart card identifiers match, then this may imply that the user device identifiers also match. This may be the case where smart card 115 has not been used with, or tied to, any other user device (other than user device 110-2) (i.e., smart card 115 was last used with user device 110-2), and user device 110-2 has not been used with any other smart card (other than smart card 115) (i.e., the last smart card used by user device 110-2 was smart card 115).

Smart card 115 may push information, such as the CDMA credentials, to user device 110-2. User device 110-2 may then use the information to obtain services and/or resources on network 125. In this case, user device 110-2 may access network 125 without the need to configure/program user device 110-2 and without the need for any user intervention.

If the smart card identifiers do not match (i.e., ICCID≠ICCID_S) and the user device identifiers match (i.e., IMEI=IMEI_S), then information from smart card 115 may be pushed to user device 110-2 (block 1140). This may be the case where smart card 115 has not been used with, or tied to, any other user device (other than user device 110-2) (i.e., the last user device with which smart card 115 was used was user device 110-2), and user device 110-2 has been used with another smart card (other than smart card 115) (i.e., the last smart card used by user device 110-2 was not smart card 115). In this case, smart card 115 may push information, such as the CDMA credentials, to user device 110-2.

A process to configure/program user device 110-2 may be initiated (block 1150). For example, smart card 115 may send a request to a network device to obtain configuration/programming information to configure/program user device 110-2.

Figure 12:
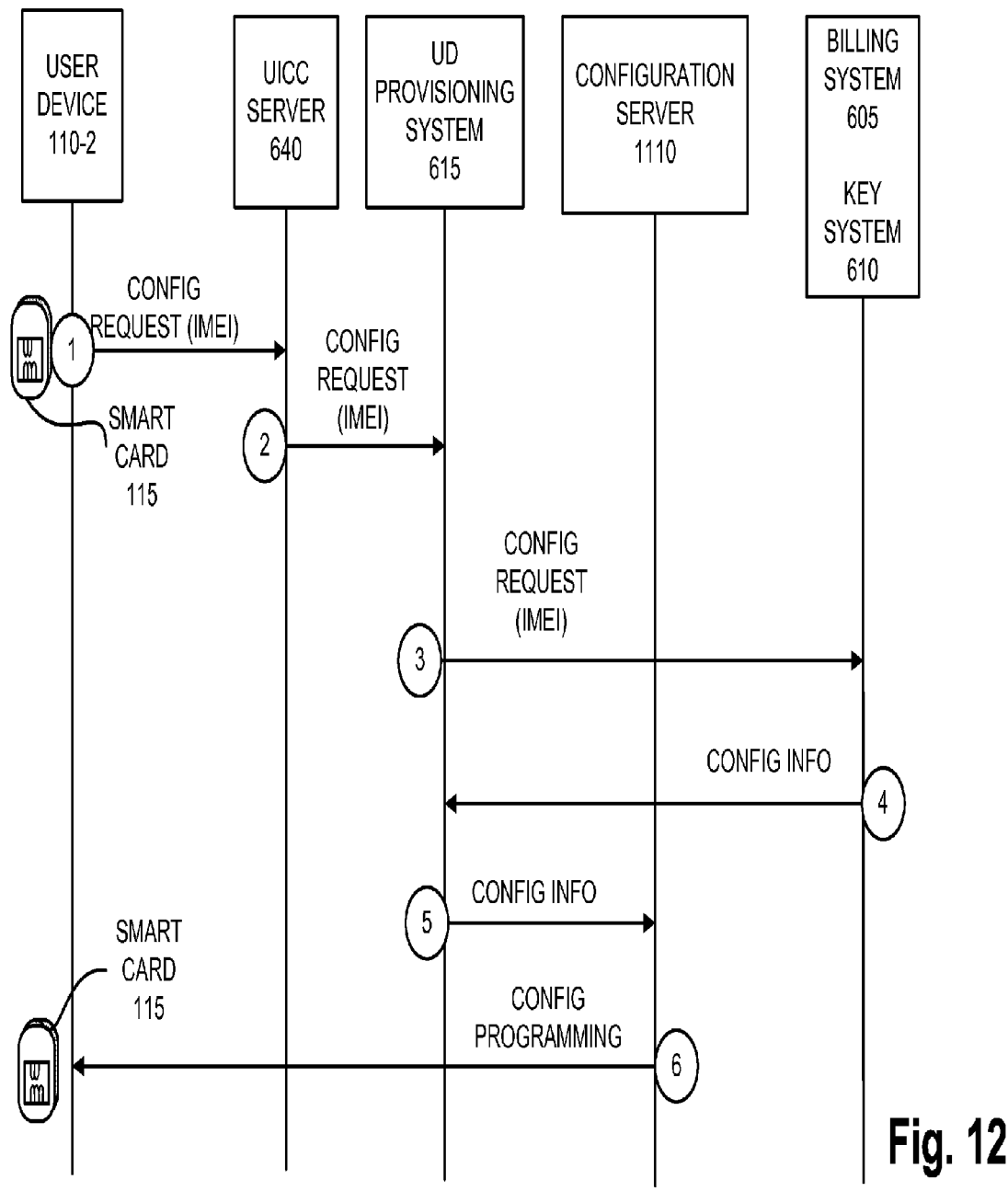
FIG. 12 is a diagram illustrating an exemplary messaging scheme for obtaining configuration/programming information to configure/program a user device.

FIG. 12 is a diagram illustrating an exemplary messaging scheme for obtaining configuration/programming information to configure/program user device 110-2. In this example, network 125 may include network devices previously illustrated and described with respect to FIG. 6. Additionally, network 125 may include a configuration server 1110. Configuration server 1110 may include a device that may communicate with user device 110-2 and/or smart card 115 to provide configuration/programming information to configure/program user device 110-2.

As illustrated in FIG. 12, smart card 115 may send a configuration request to UICC server 640, as shown as (1) in FIG. 12. In one implementation, the configuration request may include the IMEI associated with user device 110-2. UICC server 640 may receive the configuration request, process the configuration request, and issue a corresponding configuration request to UD provisioning system 615, as shown as (2) in FIG. 12. In one implementation, the configuration request, from UICC server 640, may include the IMEI associated with user device 110-2. UD provisioning system 615 may receive the configuration request, process the configuration request, and issue a corresponding configuration request to billing system 605 and/or key system 610, as shown as (3) in FIG. 12. In one implementation, the configuration request, from UD provisioning system 615, may include the IMEI associated with user device 110-2.

Billing system 605 and/or key system 610 may receive the configuration request and identify configuration information associated with the IMEI contained in the configuration request. In one implementation, the configuration information may include configuration/programming information used to configure/program user device 110-2. The configuration information may take the form of a data file, an executable application, or the like. Billing system 605 and/or key system 610 may send the configuration information to UD provisioning system 615, as shown as (4) in FIG. 12.

UD provisioning system 615 may receive the configuration information and provide the configuration information to configuration server 1110, as shown as (5) in FIG. 12. Configuration server 1110 may configure/program user device 110-2 using the configuration information, as shown as (6) in FIG. 12. For example, a data connection (e.g., an IP connection) may be established between user device 110-2 and configuration server 1110. Configuration server 1110 may configure/program user device 110-2, over the data connection, so that user device 110-2 can partake of services and/or resources on network 125.

As a result, user device 110-2 may then obtain services and/or resources on network 125. In this case, user device 110-2 may access network 125 without the need for any user intervention.

Returning to FIG. 11, if the smart card identifiers do not match (i.e., ICCID≠ICCID_S) and the user device identifiers also do not match (i.e., IMEI≠IMEI_S), then information from smart card 115 may be pushed to user device 110-2 (block 1160). This may be the case where smart card 115 has been used with, or tied to, another user device (other than user device 110-2) (i.e., the last user device with which smart card 115 was used was not user device 110-2), and user device 110-2 has been used with another smart card (other than smart card 115) (i.e., the last smart card used by user device 110-2 was not smart card 115). In this case, smart card 115 may push information, such as the CDMA credentials, to user device 110-2.

One or more network devices may be updated with the user device identifier associated with user device 110-2 (block 1170). For example, smart card 115 may initiate an update process to cause one or more network devices to recognize user device 110-2.

Figure 13:
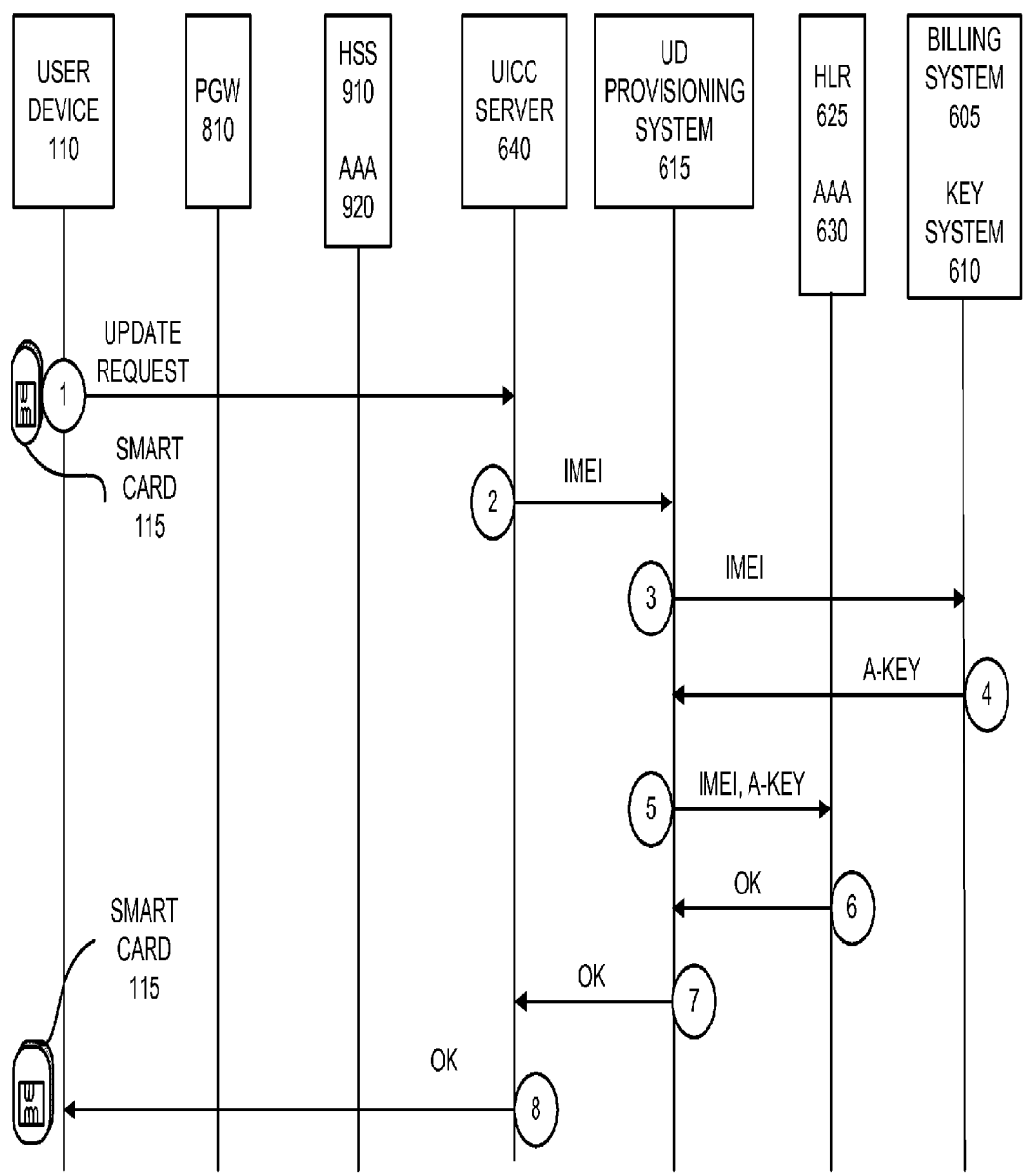
FIG. 13 is a diagram illustrating an exemplary messaging scheme for updating one or more network devices with information regarding a user device.

FIG. 13 is a diagram illustrating an exemplary messaging scheme for updating one or more network devices with information regarding user device 110-2. In this example, network 125 may include network devices previously illustrated and described with respect to FIGS. 6, 8, and 9.

As illustrated in FIG. 13, smart card 115 may send an update request to UICC server 640, as shown as (1) in FIG. 13. In one implementation, the update request may include the IMEI and the IMSI associated with user device 110-2 and user 105, respectively. Additionally, in one implementation, the IMEI and the IMSI may be incorporated with a FQDN (e.g., IMEI@vz4g.com and IMSI@vz3G.com).

UICC server 640 may recognize the request as an update request and initiate a process for updating one or more other network devices, such as HLR 625. UICC server 640 may send a request for UD provisioning system 615 to update the one or more other network devices, as shown as (2) in FIG. 13. In one implementation, the request may include the IMEI associated with user device 110-2.

UD provisioning system 615 may send a message to billing system 605 and/or key system 610 instructing these devices to provide information associated with user device 110-2, as shown as (3) in FIG. 13. In response to the message, from UD provisioning system 615, billing system 605 may obtain information associated with user device 110-2, and/or key system 610 may identify the A-key associated with user device 110-2. Key system 610 may send a response message to UD provisioning system 615, as shown as (4) in FIG. 13. In one implementation, the response message may include an A-key identified by key system 610. Billing system 605 may also send a response message to UD provisioning system 615, although this aspect is not shown in FIG. 13.

UD provisioning system 615 may receive the A-key and send a message to HLR 625 and/or AAA 630 instructing these devices to update information regarding user device 110-2, as shown as (5) in FIG. 13. In one implementation, the message, to HLR 625 and/or AAA 630, may include the IMEI and the A-key. HLR 625 may perform one more functions to update its records with information regarding user device 110-2, and/or AAA 630 may perform an authentication operation based on the IMEI and the A-key. AAA 630 may return a response message to UD provisioning system 615, although this aspect is not shown in FIG. 13. HLR 625 may also return a response message to UD provisioning system 615, as shown as (6) in FIG. 13. In one implementation, the response message, to UD provisioning system 615, may include an indication of a successful update operation (e.g., OK). Alternatively, the response message, to UD provisioning system 615, may include an indication of an unsuccessful update operation (e.g., FAIL).

UD provisioning system 615 may receive the response message from HLR 625 and return a response message to UICC server 640, as shown as (7) in FIG. 13. If the update process was successful (e.g., an A-key is received from key system 610, an OK indication in received from HLR 625, etc.), the response message, to UICC server 640, may include an indication of successful update (e.g., OK). If the update process was unsuccessful, the response message, to UICC server 640, may include an indication of an unsuccessful update (e.g., FAIL). UICC server 640 may send a response to smart card 115, as shown as (8) in FIG. 13. If the update was unsuccessful, the response may include an indication of an unsuccessful update (e.g., FAIL). If the update was successful, the response may include an indication of successful update (e.g., OK).

Returning to FIG. 11, a process to configure/program user device 110-2 may be initiated (block 1180). For example, smart card 115 may send a request to a network device to obtain configuration/programming information to configure/program user device 110-2. In one implementation, the procedure performed to obtain configuration/programming information to configure/program user device 110-2 may be similar to the procedure described with regard to FIG. 12. As a result, user device 110-2 may then obtain services and/or resources on network 125. In this case, user device 110-2 may access network 125 without the need for any user intervention.

Implementations, described herein, may permit a smart card to be moved from a first user device to a second user device, and the second user device to then be used to obtain network services and/or resources without user intervention.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5, 7, and 11, the order of the blocks may be changed in other implementations. Also, non-dependent blocks may be performed in parallel.

Also, certain functions have been described as being performed by smart card 115 and certain other functions have been described as being performed by user device 110. In other implementations, one or more of the functions, described as being performed by smart card 115, may be performed by user device 110; and/or one or more of the functions, described as being performed by user device 110, may be performed by smart card 115.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The invention claimed is:

1. A system, comprising:
one or more devices to:
receive a first request to activate a smart card associated with a user device,
determine, based on the first request, whether the user device is registered to communicate on a network,
send, when the user device is not registered, a second request to register the user device,
the user device being registered to communicate on the network based on the second request,
receive a notification based on the user device being registered, and
send, to the smart card, an activation response to activate the smart card based on either:
determining that the user device is registered, or
receiving the notification,
the activation response including information that, when accessed from the smart card, enables the user device to communicate with the network,
the one or more devices including a provisioning system, and
the one or more devices, when sending the activation response, being further to:
send, from the provisioning system and to a key system, a first message that includes an identifier associated with the user device,
receive, by the provisioning system and from the key system, a second message that includes a key associated with the user device,
the key system identifying the key based on the identifier associated with the user device,
send, from the provisioning system and to an authentication, authorization, and accounting (AAA) device, a third message that includes the identifier associated with the user device and the key,
receive, by the provisioning system and from the AAA device, results associated with authenticating the user device based on at least one of the identifier associated with the user device or the key, and
determine, by the provisioning system, to send the activation response based on the result.

2. The system of claim 1, where the information, included in the activation response, includes at least one of:
a mobile station international subscriber directory number (MSISDN),
a mobile directory number (MDN),
a mobile identification number (MIN),
a preferred roaming list (PRL),
a public land mobile network (PLMN) identifier,
a code division multiple access (CDMA) A12 network access identifier (NAI), or
a CDMA NAI.

3. The system of claim 1, where the first request includes the identifier associated with the user device, and
where, when determining whether the user device is registered, the one or more devices are further to:
compare the identifier, associated with the user device, to a set of identifiers associated with other user devices,
the other user devices being registered prior to receiving the first request, and determine that the user device is registered when the identifier, associated with the user device, is included in the set of identifiers.

4. The system of claim 1, where the one or more devices are further to at least one of:
store information associated with the user device, or
authenticate one or more of the user device or a user of the user device based on the stored information.

5. The system of claim 1, where the one or more devices further include:
a home subscriber server, and
a packet gateway,
where the home subscriber server is to:
receive an attachment request from the user device, the attachment request including an identifier associated with a user of the user device and information associated with the smart card, and
determine whether to accept the attachment request based on the identifier associated with the user and the information associated with the smart card, and
where the packet gateway is to:
receive a connection request from the user device based on the home subscriber server determining to accept the attachment request, and
establish a data connection with the user device based on data included in the connection request.

6. The system of claim 1, where the one or more devices further include:
a packet gateway,
where the AAA device is to:
receive an attachment request from the user device, the attachment request including information associated with the smart card,
perform an authentication function regarding the user device based on the information included in the attachment request, and
determine whether to accept the attachment request based on a result of the authentication function, and
where the packet gateway is to:
receive a connection request from the user device based on the AAA device determining to accept the attachment request, and
establish a data connection with the user device based on information in the connection request.

7. The system of claim 1, where the one or more devices further include:
a home agent,
where the AAA device is to:
receive an attachment request from the user device, the attachment request including information associated with the smart card,
perform an authentication function regarding the user device based on the information included in the attachment request, and
determine whether to accept the attachment request based on a result of the authentication function, and
where the home agent is to:
receive a connection request from the user device, and
establish a data connection with the user device based on the connection request.

8. A method, comprising:
receiving, by one or more devices, a request to activate a smart card associated with a user device, the smart card being different from the user device;
determining, by the one or more devices and based on the request, that the user device is unregistered;
registering, by the one or more devices and based on the request, the user device, the registering of the user device including:
causing the smart card to update credentials of the user device, and
receiving, from the smart card, information associated with the updated credentials of the user device; and
sending, by the one or more devices and to the smart card, an activation response to activate the smart card after the user device is registered,
the activation response including information, based on the updated credentials, to enable the user device to communicate with a particular network,
the activation response causing the smart card to program the user device to access the particular network using the information included in the activation response, and
the one or more devices including a provisioning system, and
sending the activation response further including:
sending, from the provisioning system and to a key system, a first message that includes an identifier associated with the user device,
receiving, by the provisioning system and from the key system, a second message that includes a key associated with the user device,
the key system identifying the key based on the identifier associated with the user device,
sending, from the provisioning system and to an authentication, authorization, and accounting (AAA) device, a third message that includes the identifier associated with the user device and the key,
receiving, by the provisioning system and from the AAA device, results associated with authenticating the user device based on at least one of the identifier associated with the user device or the key, and
determining, by the provisioning system, to send the activation response based on the result.

9. The method of claim 8, where the information, included in the activation response, includes at least one of:
a mobile station international subscriber directory number (MSISDN),
a mobile directory number (MDN),
a mobile identification number (MIN),
a preferred roaming list (PRL),
a public land mobile network (PLMN) identifier,
a code division multiple access (CDMA) A12 network access identifier (NAI), or
a CDMA NAI.

10. The method of claim 8, where the request includes the identifier associated with the user device, and
where determining whether the user device is registered includes:
comparing the identifier, associated with the user device, to a set of identifiers associated with other user devices, and
determining that the user device is registered when the identifier, associated with the user device, corresponds to an identifier in the set of identifiers associated with the other user devices.

11. The method of claim 8, where registering the user device further includes:
storing information associated with the user device, and
authenticating, based on the stored information, the user device or a user of the user device.

12. The method of claim 8, further comprising:
receiving an attachment request from the user device,
the attachment request including an identifier associated with a user of the user device and information associated with the smart card;
determining whether to accept the attachment request based on the identifier associated with the user and the information associated with the smart card;
receiving a connection request from the user device based on determining to accept the attachment request; and
establishing a data connection with the user device based on data included in the connection request.

13. The method of claim 8, further comprising:
receiving an attachment request from the user device, the attachment request including information associated with the smart card;
performing an authentication function regarding the user device based on the information included in the attachment request;
determining whether to accept the attachment request based on a result of the authentication function;
receiving a connection request from the user device; and
establishing a data connection with the user device based on information in the connection request and based on determining to accept the attachment request.

14. A non-transitory computer-readable medium to store instructions, the instructions comprising:
one or more instructions that, when executed by one or more devices, cause the one or more devices to:
receive a request to activate a smart card associated with a user device, the smart card being different from the user device;
determine, based on the request, that the user device is unregistered;
send, to the smart card and based on determining the user device is unregistered, an activation response,
the activation response causing the smart card to update credentials of the user device,
the one or more devices including a provisioning system, and
one or more instructions, to send the activation response, further including:
at least one instruction to:
send, from the provisioning system and to a key system, a first message that includes an identifier associated with the user device,
receive, by the provisioning system and from the key system, a second message that includes a key associated with the user device,
the key system identifying the key based on the identifier associated with the user device,
send, from the provisioning system and to an authentication, authorization, and accounting (AAA) device, a third message that includes the identifier associated with the user device and the key,
receive, by the provisioning system and from the AAA device, results associated with authenticating the user device based on at least one of the identifier associated with the user device or the key, and
determine, by the provisioning system, to send the activation response based on the result;
receive, from the smart card, information associated with the updated credentials of the user device; and
cause the smart card to program the user device to access a particular network based on the updated credentials.

15. The non-transitory computer-readable medium of claim 14, where the instructions further comprise:
one or more instructions that, when executed by the one or more devices, cause the one or more devices to:
receive an attachment request from the user device, the attachment request including an identifier associated with a user of the user device and information associated with the smart card;
determine whether to accept the attachment request based on the identifier associated with the user and the information associated with the smart card;
receive a connection request from the user device; and
establish a data connection with the user device based on data included in the connection request and based on determining to accept the attachment request.

16. The non-transitory computer-readable medium of claim 14, where the instructions further comprise:
one or more instructions that, when executed by the one or more devices, cause the one or more devices to:
receive an attachment request from the user device, the attachment request including information associated with the smart card;
perform an authentication function regarding the user device based on the information included in the attachment request;
determine whether to accept the attachment request based on a result of the authentication function;
receive a connection request from the user device; and
establish a data connection with the user device based on information in the connection request and based on determining to accept the attachment request.

17. The non-transitory computer-readable medium of claim 14, where the instructions further comprise:
one or more instructions that, when executed by the one or more devices, cause the one or more devices to:
authenticate, based on at least one of the identifier associated with the user device or the key, the user device to generate an authentication result; and
cause the smart card to program the user device further based on the authentication result.

* * * * *